(12) United States Patent
Hiramatsu et al.

(10) Patent No.: US 11,941,795 B2
(45) Date of Patent: Mar. 26, 2024

(54) SURFACE INSPECTION APPARATUS, NON-TRANSITORY COMPUTER READABLE MEDIUM STORING PROGRAM, AND SURFACE INSPECTION METHOD

(71) Applicant: FUJIFILM Business Innovation Corp., Tokyo (JP)

(72) Inventors: Takashi Hiramatsu, Kanagawa (JP); Kaito Tasaki, Kanagawa (JP); Kiyofumi Aikawa, Kanagawa (JP); Miho Uno, Kanagawa (JP); Hirokazu Ichikawa, Kanagawa (JP); Yoshitaka Kuwada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 38 days.

(21) Appl. No.: 17/517,670

(22) Filed: Nov. 3, 2021

(65) Prior Publication Data

US 2022/0392050 A1 Dec. 8, 2022

(30) Foreign Application Priority Data

Jun. 8, 2021 (JP) ................. 2021-095767

(51) Int. Cl.
*G06T 7/40* (2017.01)
*G06T 7/00* (2017.01)
*G06T 11/60* (2006.01)

(52) U.S. Cl.
CPC .............. *G06T 7/0004* (2013.01); *G06T 7/40* (2013.01); *G06T 11/60* (2013.01); *G06T 2207/30164* (2013.01)

(58) Field of Classification Search
CPC ...................... G06T 11/60; G06T 2207/30164
See application file for complete search history.

(56) References Cited

U.S. PATENT DOCUMENTS

| | | | |
|---|---|---|---|
| 6,201,541 B1* | 3/2001 | Shalom | G06T 3/0068 382/284 |
| 10,768,118 B2* | 9/2020 | Harada | G01B 11/30 |
| 2002/0171826 A1* | 11/2002 | Wiles | G01N 21/57 356/237.2 |
| 2010/0052676 A1* | 3/2010 | Sugiura | G01R 33/4833 324/309 |
| 2011/0181873 A1* | 7/2011 | Yavets-Chen | G01N 21/55 356/237.2 |
| 2012/0256901 A1* | 10/2012 | Bendall | G01B 11/24 345/419 |
| 2013/0271798 A1* | 10/2013 | Nakamura | H04N 1/40 358/463 |

(Continued)

FOREIGN PATENT DOCUMENTS

| | | |
|---|---|---|
| JP | 2013040895 | 2/2013 |
| JP | 2015232480 | 12/2015 |
| JP | 5966277 | 8/2016 |

*Primary Examiner* — Timothy R Newlin
(74) *Attorney, Agent, or Firm* — JCIPRNET

(57) ABSTRACT

A surface inspection apparatus includes an imaging device configured to image a surface of an object to be inspected, and a processor configured to: calculate a numerical value representing a quality of the surface by processing an image captured by the imaging device, and receive a change in a range used to calculate the numerical value indicated by an index in the image.

16 Claims, 23 Drawing Sheets

(56) References Cited

U.S. PATENT DOCUMENTS

| | | | | |
|---|---|---|---|---|
| 2014/0053399 | A1* | 2/2014 | Askebjer | B41J 2/435 |
| | | | | 29/846 |
| 2015/0042584 | A1* | 2/2015 | Lee | G06F 3/0412 |
| | | | | 345/173 |
| 2015/0235373 | A1* | 8/2015 | Kato | H04N 13/128 |
| | | | | 348/51 |
| 2016/0040985 | A1* | 2/2016 | Nagai | G01J 3/14 |
| | | | | 356/600 |
| 2016/0379360 | A1* | 12/2016 | Ito | G06T 7/0004 |
| | | | | 382/152 |
| 2018/0096454 | A1* | 4/2018 | Amirghodsi | G06T 7/73 |
| 2018/0330171 | A1* | 11/2018 | Corcoran | G06V 10/40 |
| 2018/0330526 | A1* | 11/2018 | Corcoran | B60R 1/00 |
| 2019/0080449 | A1* | 3/2019 | Stevens | G06T 7/0004 |
| 2019/0096057 | A1* | 3/2019 | Allen | G06T 7/0008 |
| 2020/0088650 | A1* | 3/2020 | Harada | G01N 21/8851 |
| 2020/0149872 | A1* | 5/2020 | Fujiwara | G01B 11/0608 |
| 2021/0256231 | A1* | 8/2021 | Aikawa | G06K 19/0728 |
| 2022/0059376 | A1* | 2/2022 | Liao | H04N 23/695 |
| 2022/0254143 | A1* | 8/2022 | Lin | G06V 30/19107 |

* cited by examiner (A)

(B)

10

(C)

S

EX: PARTIAL REGION THAT CONTRIBUTES TO CALCULATION OF SCORE

EX: RANGE FOR CALCULATING LUMINANCE PROFILE

# SURFACE INSPECTION APPARATUS, NON-TRANSITORY COMPUTER READABLE MEDIUM STORING PROGRAM, AND SURFACE INSPECTION METHOD

CROSS-REFERENCE TO RELATED APPLICATIONS

This application is based on and claims priority under 35 USC 119 from Japanese Patent Application No. 2021-095767 filed Jun. 8, 2021.

BACKGROUND

(i) Technical Field

The present invention relates to a surface inspection apparatus, a non-transitory computer readable medium storing a program, and a surface inspection method.

(ii) Related Art

Today, in various products, parts made by molding synthetic resin (hereinafter referred to as "molded products") are used. On the other hand, visually observable defects may appear on the surface of the molded product. This type of defect includes a "sink mark" that is an unintentionally formed dent, a "weld" that is formed at a portion where the molten resin joins, and the like. In addition, even in the case of texture processing in which unevenness is intentionally formed on the surface, a difference from the expected texture may appear. The texture changes due to combined factors of color, luster, and unevenness.

SUMMARY

An apparatus that inspects the quality of the surface of an object (hereinafter also referred to as a "surface inspection apparatus") is provided with a function of displaying a reference line that defines a range for calculating a numerical value representing the quality of the captured image. The shape of this range is fixedly given by the surface inspection apparatus, and no change in the range is assumed.

However, the shape and size of defects appearing on the surface of an object vary. Therefore, the range determined by the surface inspection apparatus may be too wide than the size of the defect that the user pays attention to. In this case, the calculated numerical value is more susceptible to noise than the defect of interest.

Further, even in a case where it is wished to check the texture of a specific portion, structural unevenness and other defects may be included within the range determined by the surface inspection apparatus. In this case as well, the calculated numerical value is affected by information other than the portion of interest.

An example of related art includes JP5966277B.

Aspects of non-limiting embodiments of the present disclosure relate to a surface inspection apparatus and a non-transitory computer readable medium storing a program that enable the calculation of a numerical value having less influence other than a portion of interest of a user as compared with the case where the shape of a range used to calculate a numerical value representing a quality of the surface is fixed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a surface inspection apparatus including an imaging device configured to image a surface of an object to be inspected, and a processor configured to: calculate a numerical value representing a quality of the surface by processing an image captured by the imaging device, and receive a change in a range used to calculate the numerical value indicated by an index in the image.

BRIEF DESCRIPTION OF THE DRAWINGS

Exemplary embodiment(s) of the present invention will be described in detail based on the following figures, wherein:

FIGS. 2A and 2B are diagrams illustrating an example of defects appearing on the surface of an inspection target, in which FIG. 2A shows an example of sink marks, and FIG. 2B shows an example of a weld;

FIGS. 4A and 4B are diagrams illustrating a structural example of an optical system of the surface inspection apparatus according to the first exemplary embodiment, in which FIG. 4A shows schematically an internal structure of a housing of the surface inspection apparatus and FIG. 4B shows a structure of an opening portion pressed against the surface of an inspection target at the time of inspection;

FIGS. 8A and 8B are diagrams illustrating a reason for preparing a function of changing an inspection range, in which FIG. 8A shows a luminance profile before changing the inspection range and FIG. 8B shows a luminance profile after changing the inspection range;

DETAILED DESCRIPTION

First Exemplary Embodiment

Usage Example of Surface Inspection Apparatus

Hereinafter, exemplary embodiments of the present invention will be described with reference to the drawings.

Figure 1:
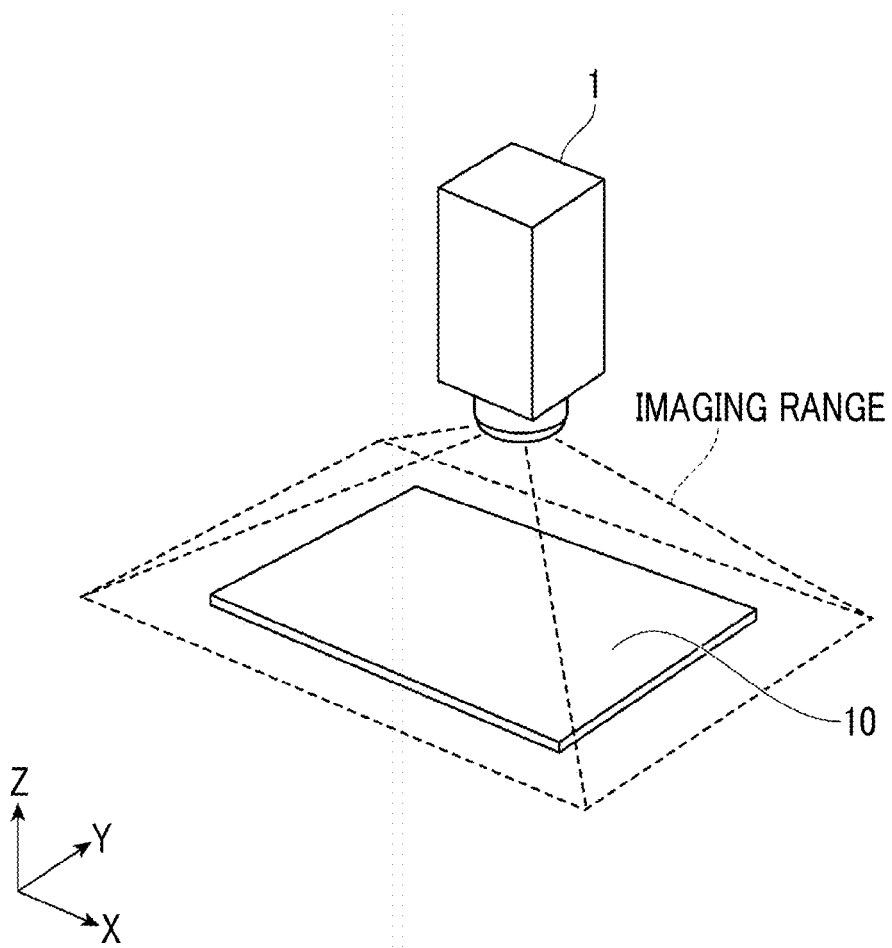
FIG. 1 is a diagram illustrating a usage example of a surface inspection apparatus assumed in a first exemplary embodiment.

FIG. 1 is a diagram illustrating a usage example of a surface inspection apparatus 1 assumed in a first exemplary embodiment.

An imaging unit of the surface inspection apparatus 1 used in the first exemplary embodiment is a so-called area camera, and a range to be imaged (hereinafter referred to as an "imaging range") is defined by a surface. Illuminations (not shown) are configured to include components that are specular reflection conditions over the entire imaging range.

In the case of FIG. 1, the imaging range includes the entire object to be inspected (hereinafter also referred to as an "inspection target") 10. However, the imaging range may include only a portion of the inspection target 10 of interest.

A molded product is assumed as the inspection target 10 in the present exemplary embodiment.

In the case of the inspection by the area camera, the inspection by the surface inspection apparatus 1 and the inspection target 10 is performed in a stationary state. In other words, the inspection of the surface of the inspection target 10 is performed in a state where the surface inspection apparatus 1 and the inspection target 10 do not move relatively.

In the case of FIG. 1, the inspection target 10 has a plate shape, but the inspection target 10 may have any shape. For example, the inspection target 10 may have a shape having a curved surface such as a sphere or a cylinder, in addition to a polyhedron, for example.

The actual inspection target 10 may have holes, notches, protrusions, steps, and the like.

The types of surface finishes of the inspection target 10 include no processing, mirror finish processing, semi-mirror finish processing, and texturing processing.

The surface inspection apparatus 1 inspects defects on the surface and textures of the inspection target 10.

Defects include, for example, sink marks and welds. The sink mark refers to a dent on the surface generated in the thick portion or the rib portion, and the weld refers to a streak generated in the portion where the tips of the molten resin join in the mold. The defects also include scratches and dents caused by hitting an object.

The texture is a visual or tactile impression, and is influenced by the color, luster, and unevenness of the surface of the object. The unevenness of the surface also includes streaks generated in cutting the mold. This type of streak is different from a defect.

Figure 2A:
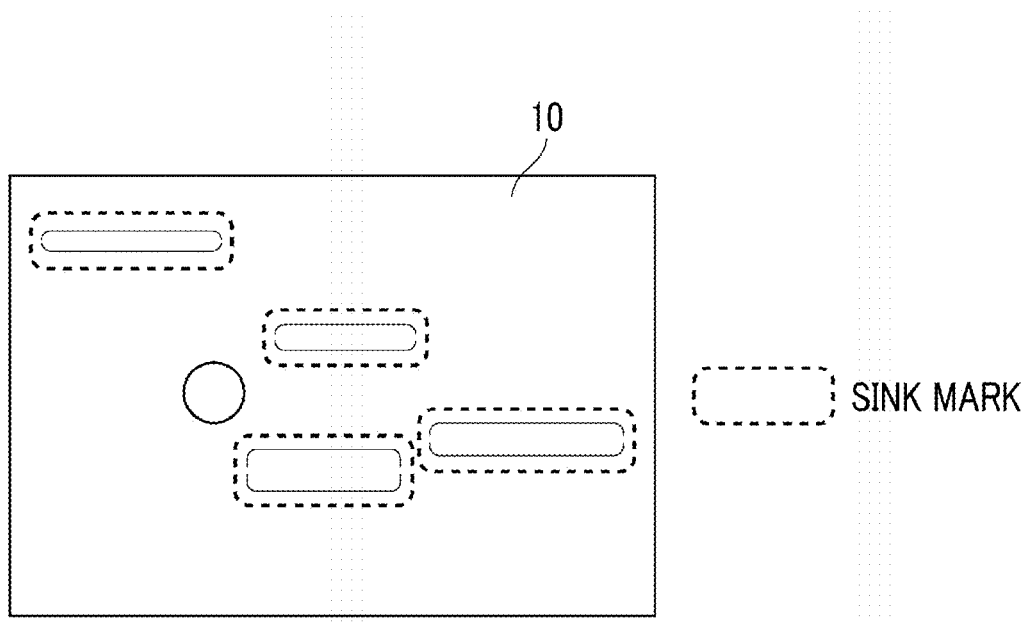
Figure 2B:
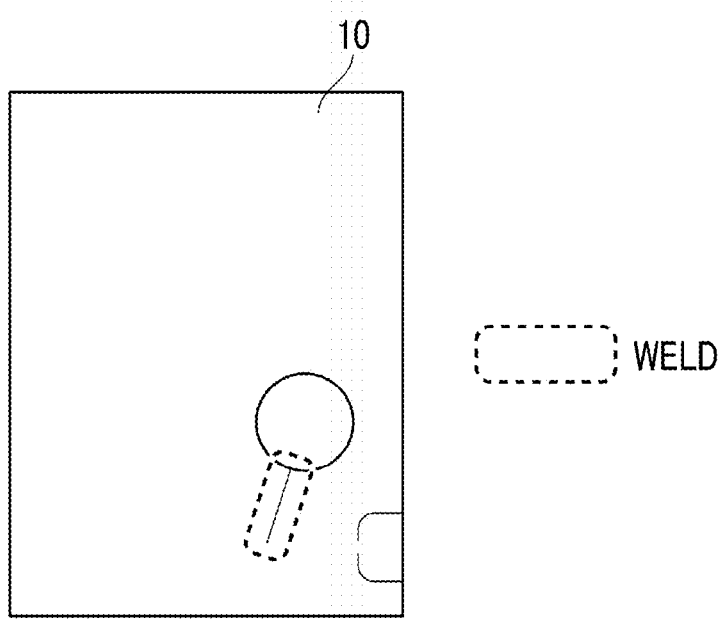

FIGS. 2A and 2B are diagrams illustrating an example of defects appearing on the surface of the inspection target 10. FIG. 2A shows an example of sink marks, and FIG. 2B shows an example of a weld. In FIGS. 2A and 2B, the defective portion is surrounded by a broken line. There are four sink marks in FIG. 2A.

The surface inspection apparatus 1 according to the present exemplary embodiment is used not only for inspection of defects and texture, but also for inspection of surface stains.

The surface inspection apparatus 1 generates an image in which defects on the surface of the inspection target 10 are emphasized, and quantifies a result of evaluating the texture to output the result.

The defects herein are unevenness and streaks appearing in the portion that should be flat, that is, sink marks and welds. The texture is evaluated by a numerical value (hereinafter also referred to as a "score"). The score is an example of a numerical value representing the quality of the surface of the inspection target 10.

For example, multivariate analysis is used to calculate the score. In multivariate analysis, for example, features appearing in the luminance distribution are analyzed. An example of a feature includes a streaky pattern extending along a direction of the sink mark, for example.

In addition, there is also a method of using artificial intelligence to calculate the score. For example, the score of a partial region within the inspection range is calculated by giving the image captured by the camera to a learning model obtained by deep machine learning of the relationship between the image of the defect and the score.

The inspection target 10 shown in FIG. 1 is installed parallel to the planes defined by an X axis and a Y axis. In this case, the normal of the surface of the inspection target 10 is parallel to a Z axis.

On the other hand, the surface inspection apparatus 1 is arranged vertically above the inspection target 10. In other words, an optical axis of an optical system used by the surface inspection apparatus 1 for imaging the inspection target 10 is set substantially parallel to the normal of the surface of the inspection target 10. Hereinafter, the conditions required for this optical axis are also referred to as "imaging conditions".

In this case, the surface inspection apparatus 1 is installed at a position that satisfies the imaging conditions. The surface inspection apparatus 1 may be installed by fixing the surface inspection apparatus to a specific member, or may be detachably attached to the specific member.

However, the surface inspection apparatus 1 may be a portable apparatus. In a case where the surface inspection apparatus is portable, an operator inspects any surface by, for example, holding the surface inspection apparatus 1 in his/her hand and directing the light receiving surface toward the inspection target 10.

In FIG. 1, for the purpose of describing the positional relationship between the surface inspection apparatus 1 and the inspection target 10, the appearance of the surface inspection apparatus 1 is simplified and represented as a substantially rectangular parallelepiped.

Configuration of Surface Inspection Apparatus

Figure 3:
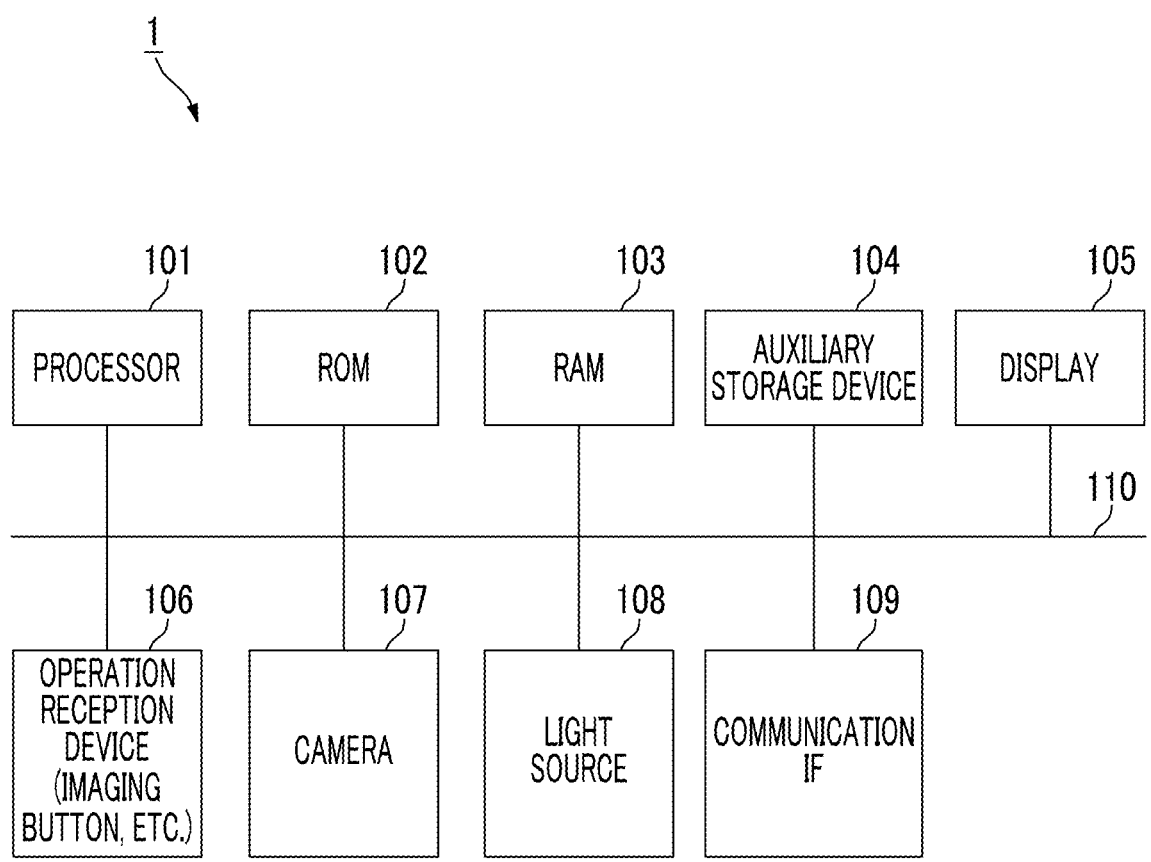
FIG. 3 is a diagram illustrating an example of a hardware configuration of the surface inspection apparatus used in the first exemplary embodiment.

FIG. 3 is a diagram illustrating an example of a hardware configuration of the surface inspection apparatus 1 used in the first exemplary embodiment.

The surface inspection apparatus 1 shown in FIG. 3 includes a processor 101 that controls the operation of the entire apparatus, a read only memory (ROM) 102 in which a basic input output system (BIOS) and the like are stored, a random access memory (RAM) 103 used as a work area of the processor 101, an auxiliary storage device 104 in which programs and image data are stored, a display 105 that displays a captured image of the surface of the inspection target 10 or information on operations, an operation reception device 106 that receives operations of an operator, a camera 107 that images the surface of the inspection target 10, a light source 108 that illuminates the surface of the inspection target 10, and a communication interface (IF) 109 used for communication with the outside. The processor 101 and each part are connected to each other through a signal line 110 such as a bus.

The processor 101, the ROM 102, and the RAM 103 function as so-called computers.

The processor 101 realizes various functions through the execution of a program. For example, the processor 101 performs the calculation or the like of the score for evaluating the texture of the imaged surface of the inspection target 10 through the execution of the program.

Image data obtained by imaging the surface of the inspection target 10 is stored in the auxiliary storage device 104. For the auxiliary storage device 104, for example, a semiconductor memory or a hard disk device is used. Firmware and application programs are also stored in the auxiliary storage device 104. In the following, firmware and application programs are collectively referred to as a "program".

The program that realizes the functions described in the present exemplary embodiment and other exemplary embodiments which will be described later can be provided not only by a communication unit but also by storing the program in a recording medium such as a CD-ROM.

The display 105 is, for example, a liquid crystal display or an organic EL display, and displays an image of the entire inspection target 10 or a specific portion of the inspection target 10. The display 105 is also used for positioning the imaging range with respect to the inspection target 10.

In the case of the present exemplary embodiment, the display 105 is integrally provided in the main body of the surface inspection apparatus, but may be an external device connected through the communication IF 109 or a part of another device connected through the communication IF 109. For example, the display 105 may be a display of another computer connected through the communication IF 109.

The operation reception device 106 is configured with a touch sensor arranged on the display 105, physical switches and buttons arranged on a housing, and the like.

In the case of the present exemplary embodiment, a power button and an imaging button are provided as an example of physical buttons. In a case where the power button is operated, for example, the light source 108 is turned on and the imaging by the camera 107 is started. Further, in a case where the imaging button is operated, a specific image captured by the camera 107 at the time of operation is acquired as an image for inspection. The imaging button herein is an example of a third operator.

A device that integrates the display 105 and the operation reception device 106 is called a touch panel. The touch panel is used to receive operations of a user on keys displayed in software (hereinafter also referred to as "soft keys").

In the case of the present exemplary embodiment, a color camera is used as the camera 107. For the image sensor of the camera 107, for example, a charge coupled device (CCD) imaging sensor element or a complementary metal oxide semiconductor (CMOS) imaging element is used.

Since a color camera is used as the camera 107, it is possible in principle to observe not only the luminance of the surface of the inspection target 10 but also the color tone. The camera 107 is an example of an imaging device.

In the case of the present exemplary embodiment, a white light source is used as the light source 108. The white light source generates light in which light in a visible light band is evenly mixed.

In the case of the present exemplary embodiment, a parallel light source is used as the light source 108. Further, a telecentric lens is arranged on the optical axis of the camera 107.

The light source 108 in the present exemplary embodiment is arranged at an angle at which a light component specular-reflected on the surface of the inspection target 10 is mainly incident on the camera 107.

The communication IF 109 is configured with a module conforming to a wired or wireless communication standard. For the communication IF 109, for example, an Ethernet (registered trademark) module, a universal serial bus (USB), a wireless LAN, or the like is used.

Structure of Optical System

Figure 4A:
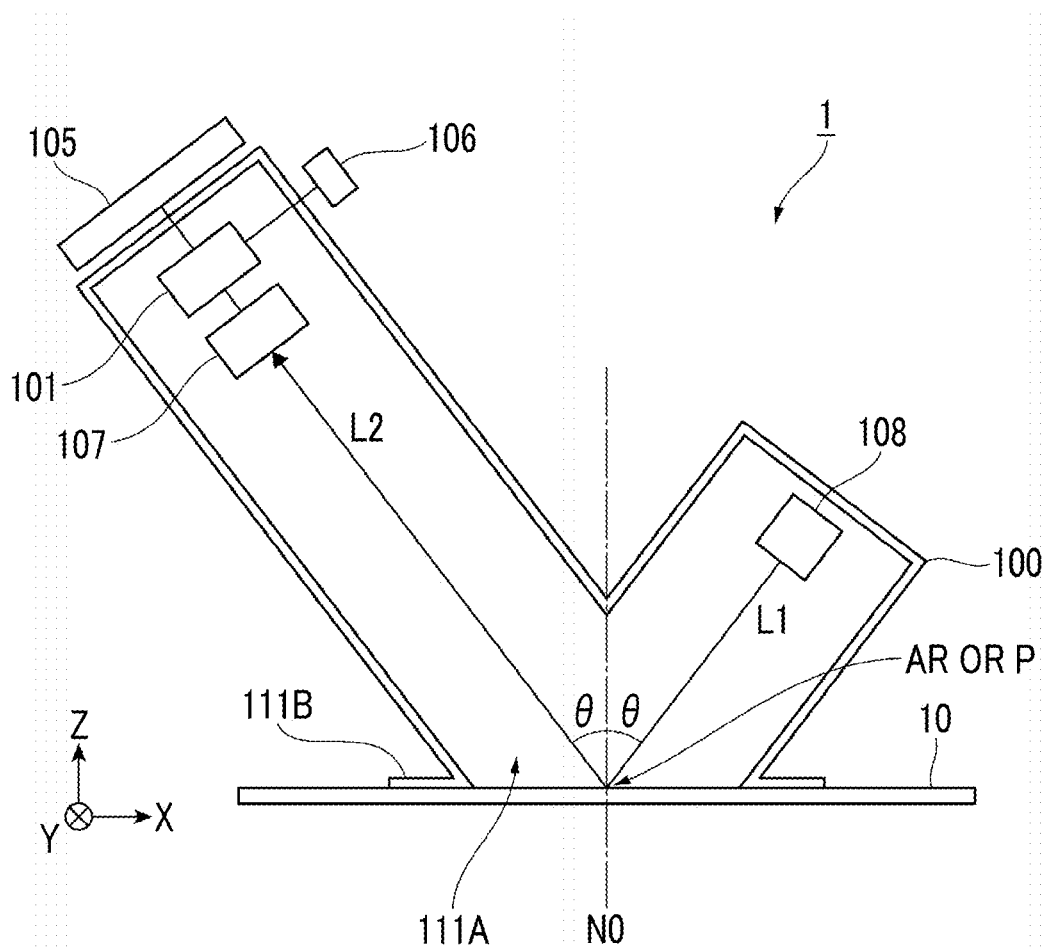
Figure 4B:
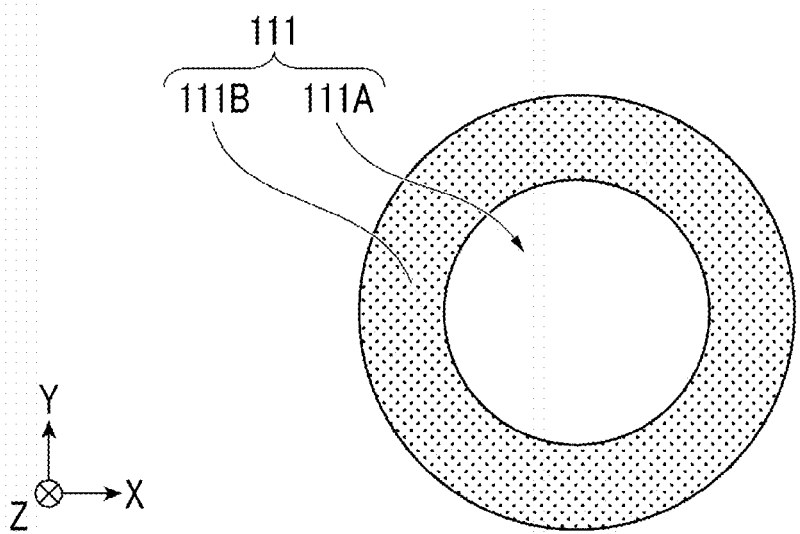

FIGS. 4A and 4B are diagrams illustrating a structural example of an optical system of the surface inspection apparatus 1 according to the first exemplary embodiment. FIG. 4A shows schematically an internal structure of a housing 100 of the surface inspection apparatus 1, and FIG. 4B shows a structure of an opening portion 111 pressed against the surface of the inspection target 10 at the time of inspection.

The opening portion 111 is provided with an opening 111A into which illumination light illuminating the surface of the inspection target 10 and reflected light reflected by the surface of the inspection target 10 are input/output, and a flange 111B surrounding an outer edge of the opening 111A.

In the case of FIGS. 4A and 4B, both the opening 111A and the flange 111B have a circular shape. However, the opening 111A and the flange 111B may have other shapes. For example, the opening 111A and the flange 111B may have a rectangular shape.

The opening 111A and the flange 111B do not have to have similar shapes, the opening 111A may have a circular shape, and the flange 111B may have a rectangular shape.

The flange 111B is used for positioning the surface inspection apparatus 1 in an imaging direction with respect to the surface of the inspection target 10. In other words, the flange 111B is used for positioning the camera 107 and the light source 108 with respect to the surface to be inspected. The flange 111B also serves to prevent or reduce the incident of external light or ambient light on the opening 111A.

The housing 100 shown in FIG. 4A has a structure in which two members having a substantially tubular shape are connected, and the light source 108 is attached to one member side, and the camera 107 and the processor 101 are attached to the other member side.

Further, the display 105 and the operation reception device 106 are attached to the side surface of the housing 100 on the side where the camera 107 is attached.

A modulation transfer function (MTF) in the field of view of the camera 107 is generally uniform. Therefore, the variation in contrast due to the difference in the position in the field of view is small, and the surface of the inspection target 10 can be faithfully imaged.

In the case of FIG. 4A, in the flat plate-shaped inspection target 10, the normal of the surface of the inspection target 10 is indicated by N0. Further, in FIG. 4A, the optical axis of the illumination light output from the light source 108 is indicated by L1, and the optical axis of the reflected light specular-reflected on the surface of the inspection target 10 is indicated by L2. The optical axis L2 herein coincides with the optical axis of the camera 107.

The surface of the actual inspection target 10 has structural or design unevenness, curved surfaces, steps, joints, fine unevenness formed in the molding process, and the like.

Therefore, as the normal N0 of the inspection target 10, an average value of the normal N0 of a region AR of interest in the inspection target 10 or the normal N0 of a specific position P of interest may be used.

Further, as the normal line N0 of the inspection target 10, the normal line N0 of the average virtual surface or the representative portion of the inspection target 10 may be used.

In the case of FIG. 4A, the optical axis L1 of the illumination light output from the light source 108 and the optical axis L2 of the camera 107 are both attached at an angle θ with respect to the normal line N0. For the angle θ, for example, approximately 30° or approximately 45° is used.

Inspection Operation

Basic Operation

Figure 5:
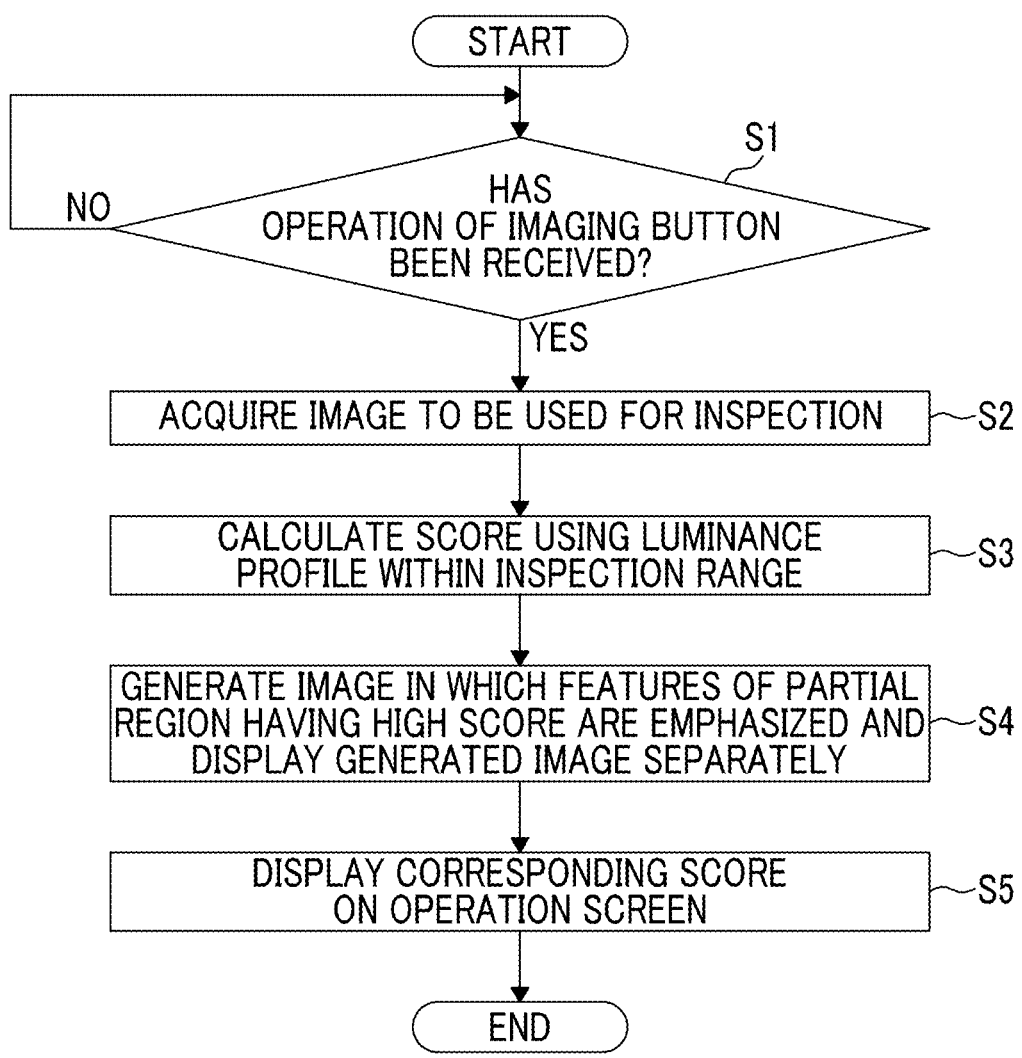
FIG. 5 is a flowchart illustrating an example of an inspection operation by the surface inspection apparatus used in the first exemplary embodiment.

FIG. 5 is a flowchart illustrating an example of an inspection operation by the surface inspection apparatus 1 used in the first exemplary embodiment. The symbol S shown in the figure means a step.

The process shown in FIG. 5 is implemented through the execution of the program by the processor 101 (see FIGS. 4A and 4B).

In the surface inspection apparatus 1 according to the present exemplary embodiment, the light source 108 (see FIGS. 4A and 4B) is turned on by operating the power button, and the imaging by the camera 107 (see FIGS. 4A and 4B) is started. The captured image is displayed on the display 105 (see FIGS. 4A and 4B).

Figure 6:
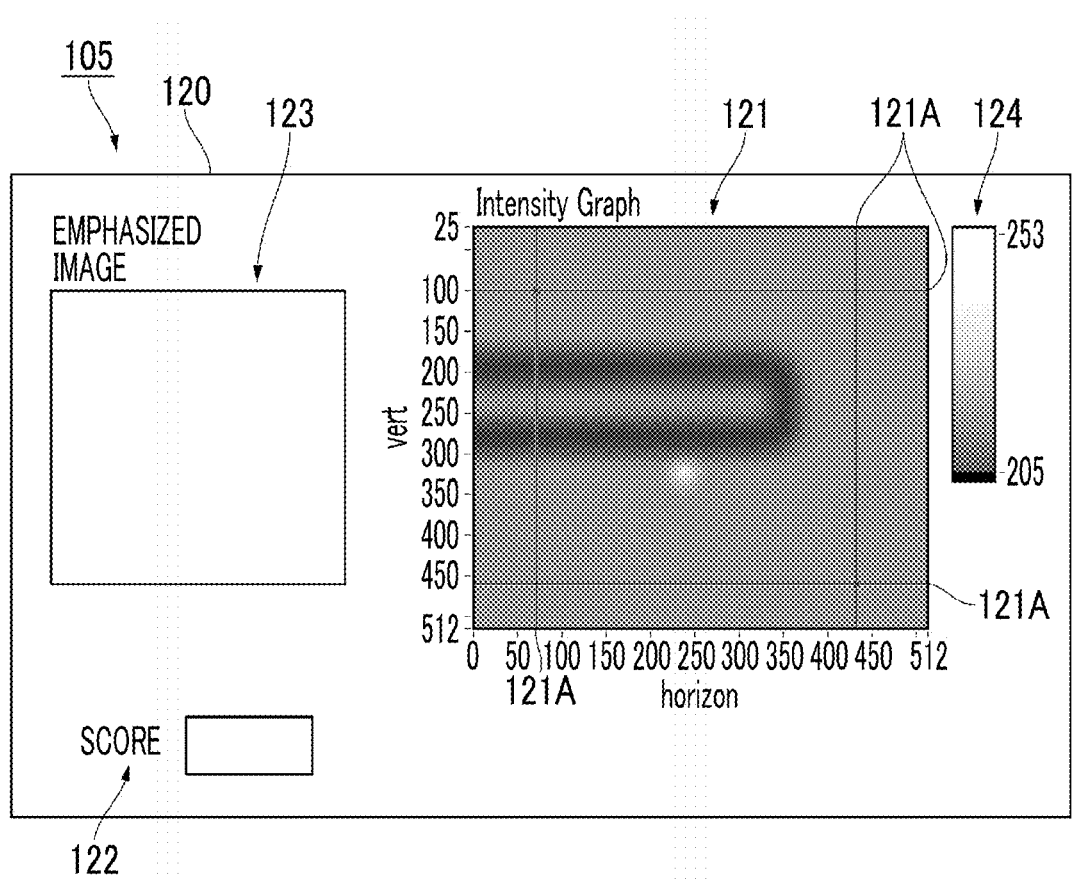
FIG. 6 is a diagram illustrating an example of an operation screen displayed on a display.

FIG. 6 is a diagram illustrating an example of an operation screen 120 displayed on the display 105. On the operation screen 120 shown in FIG. 6, a display field of an image (hereinafter referred to as a "captured image field") 121 captured by the camera 107, a score field 122, a display field of an image in which the features of a partial region that has contributed to the calculation of the score are emphasized (hereinafter referred to as an "emphasized image field") 123, and a legend 124 are arranged.

In the captured image field 121, a distribution of luminance values, that is, a grayscale image is displayed. In the case of FIG. 6, a reference line 121A that gives the outer edge of the inspection range used for the calculation of the score is displayed. The reference line 121A is an example of a first index indicating the inspection range before the change.

In the example of FIG. 6, the range surrounded by the four reference lines 121A is the inspection range. For images within the inspection range, a score representing the quality of the surface is calculated.

The legend 124 is shown on the right side of the captured image field 121. In the case of FIG. 6, the shading of the captured image field 121 corresponds to the gradation values "205" to "253".

In the case of the operation screen 120 shown in FIG. 6, since the score has not been calculated yet, the score field 122 is blank and the image is not displayed in the emphasized image field 123 either.

FIG. 5 is referred to again for description.

In the present exemplary embodiment, in a case where an operator checking the image displayed on the display 105 operates the imaging button, the image used for evaluating the quality of the surface is determined.

Therefore, the processor 101, which has started the inspection operation by operating the power button, determines whether or not the operation of the imaging button has been received (step S1). The operation of the operation button is an example of an operation of giving an instruction to start an inspection.

While a negative result is obtained in step S1, the processor 101 repeats the determination in step S1.

In a case where a positive result is obtained in step S1, the processor 101 acquires an image to be used for inspection (step S2). Specifically, the image displayed on the display 105 at the time when the imaging button is operated is acquired.

In the case of the present exemplary embodiment, in a case where the imaging button is operated, the update of the image displayed in the captured image field 121 (see FIG. 6) is stopped even though the imaging by the camera 107 is continued.

Next, the processor 101 calculates the score using the luminance profile within the inspection range (step S3). That is, the score is calculated for the image within the range surrounded by the four reference lines 121A displayed in the captured image field 121.

Figure 7:
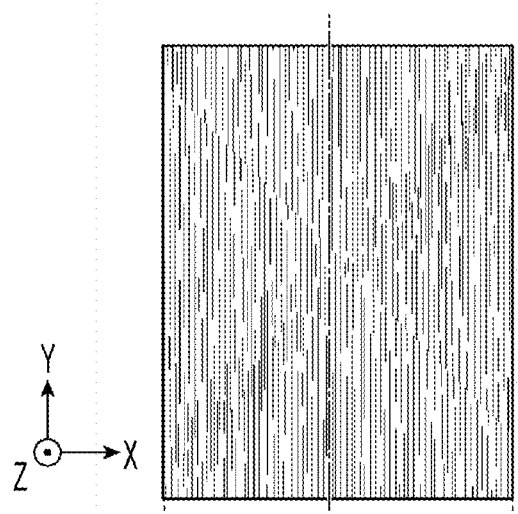
FIG. 7 is a diagram illustrating a principle of score calculation, in which a part (A) in FIG. 7 shows an example of an image acquired as a target of inspection, a part (B) in FIG. 7 shows an example of a cross section of a dent formed in a Y-axis direction in an X direction, and a part (C) in FIG. 7 shows a luminance profile of the image.
Figure 7:
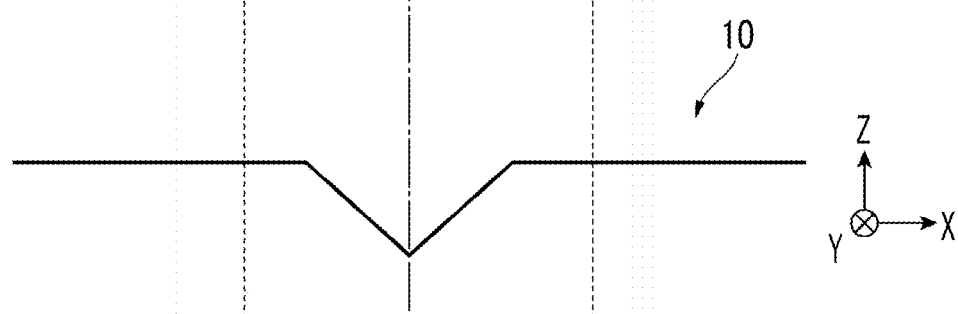
Figure 7:
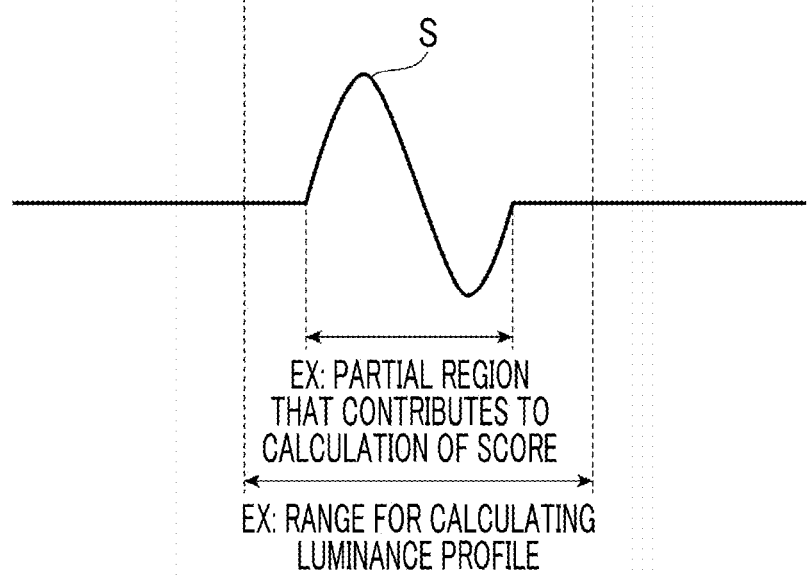

FIG. 7 is a diagram illustrating a principle of score calculation. A part (A) in FIG. 7 shows an example of an image acquired as a target of inspection, a part (B) in FIG. 7 shows an example of a cross section of a dent formed in a Y-axis direction in an X direction, and a part (C) in FIG. 7 shows a luminance profile S of the image.

The dent shown in the part (B) in FIG. 7 represents, for example, a sink mark. The part (B) in FIG. 7 shows a case where the cross-sectional shape is an isosceles triangle for convenience of description, but of course, this shape is an example.

In this case, the luminance profile S shown in the part (C) in FIG. 7 is given as a change in a luminance value (hereinafter referred to as a "representative luminance value") representing each coordinate in the X-axis direction.

The representative luminance value herein is given as an integral value of the luminance values of the pixels having an identical X coordinate. The convex waveform of the luminance profile S shows a bright region as compared with the surroundings, and the concave waveform of the luminance profile S shows a dark region as compared with the surroundings.

The score is calculated as, for example, a difference between the maximum value and the minimum value of the luminance profile S (that is, the wave height).

The score depends on the width, height, depth, number, etc. of the unevenness formed on the surface. For example, even though the height of the convex portion and the depth of the concave portion are identical, the score of the partial region where the convex portion or the concave portion having a longer width is formed becomes high.

Further, even though the widths of the convex portion and the concave portion are identical, the score of the partial region where the higher convex portion and the deeper concave portion are formed becomes high. In the case of the present exemplary embodiment, a high score means poor quality.

In the present exemplary embodiment, the partial region that contributes to the calculation of the score is defined as a space between the start point of the convex waveform and the end point of the concave waveform of the luminance profile S shown in the part (C) in FIG. 7.

FIG. 5 is referred to again for description.

In the case where the score is calculated, the processor 101 generates an image in which the features of the partial region having a high score are emphasized (hereinafter referred to as an "emphasized image") and displays the generated image separately (step S4).

In the present exemplary embodiment, the processor 101 extracts a specific periodic component appearing in a specific direction from the extracted partial region, and generates an emphasized image by superimposing the feature image on the original image by the inverse transformation of the extracted periodic component.

For the extraction of periodic components, for example, two-dimensional DCT (=Discrete Cosine Transform), DST (=Discrete Sine Transform), FFT (=Fast Fourier Transform), and the like are used.

In inverse transformation to the feature image, an intensity component (that is, a luminance value) of each pixel is normalized by the maximum value, and a gradation range of the feature image is expanded. In addition, by mapping a color component to the intensity component of the feature image, it is possible to distinguish the feature image from the original image portion expressed in gray scale.

By displaying the emphasized image, it is possible to check the surface state even in a case where it is difficult to visually recognize the minute structure in the grayscale image obtained by imaging the surface of the partial region where the score is calculated.

In the case of the present exemplary embodiment, the generated emphasized image is displayed side by side in the operation screen identical to the grayscale image captured by the camera 107.

In addition, the processor 101 displays the corresponding score on the operation screen 120 (see FIG. 6) (step S5).

Change of Inspection Range

In the surface inspection apparatus 1 according to the present exemplary embodiment, the operator is allowed to change the inspection range.

Figure 8A:
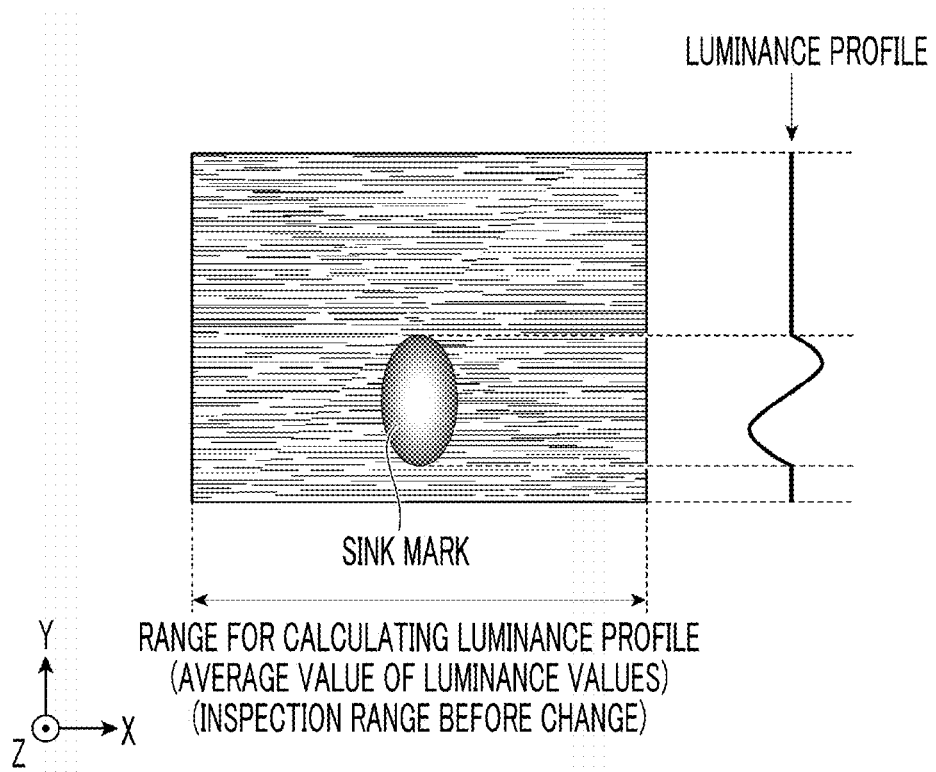
Figure 8B:
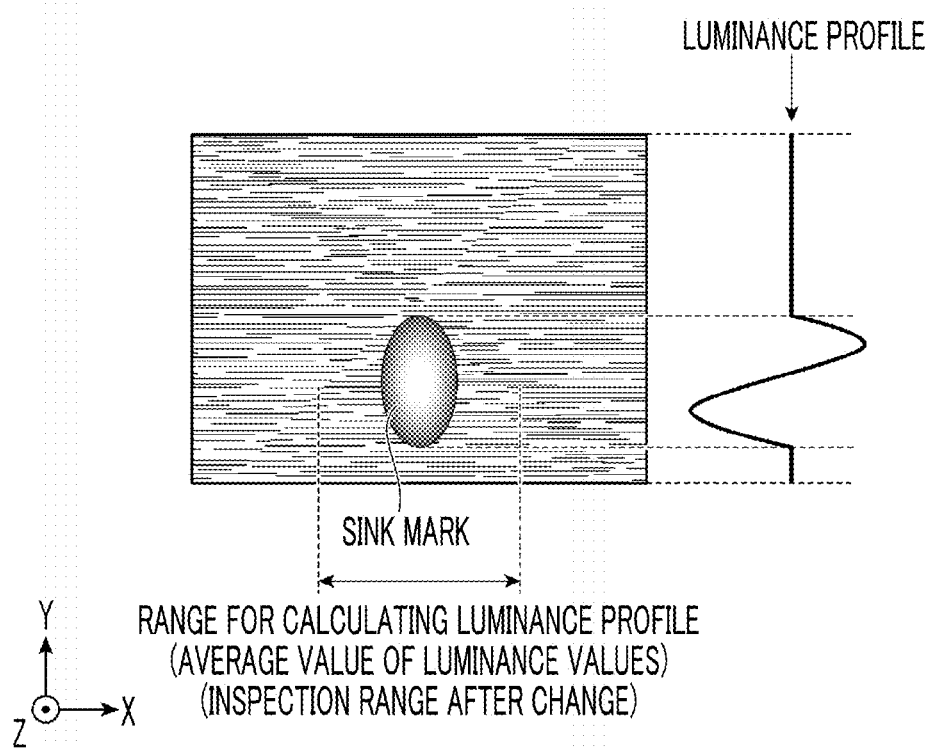

FIGS. 8A and 8B are diagrams illustrating a reason for preparing a function of changing an inspection range. FIG. 8A shows a luminance profile before changing the inspection range, and FIG. 8B shows a luminance profile after changing the inspection range.

The images shown in FIGS. 8A and 8B represent images in the inspection range surrounded by the four reference lines 121A (see FIG. 6) in the image displayed in the captured image field 121 (see FIG. 6).

In the case of FIGS. 8A and 8B, the luminance profile of each coordinate value in a Y-axis direction is given as the average value of the luminance values in each coordinate value in an X-axis direction.

In the case of the inspection range before the change shown in FIG. 8A, the size of the sink mark is narrower than the width of the inspection range in the X-axis direction. Therefore, the wave height of the luminance profile given by the average value of the luminance values becomes small. That is, it may be calculated as a value whose score is smaller than the actual defect.

In the case of the inspection range after the change shown in FIG. 8B, the width in the X-axis direction is narrower than that before the change. Therefore, the wave height of the luminance profile given by the average value of the luminance values becomes larger than that before the change. As a result, the score value becomes higher than before the inspection range is changed, and it is possible to calculate the score that more reflects the state of defects of interest of the operator, such as sink marks.

Further, even in a case where there are structural unevenness or other defects that are not of interest around the defect of interest, it is possible to avoid the influence of these and calculate the score for a specific defect.

Also, in a case where it is wished to inspect the quality of the surface excluding defects, it is possible to calculate the score excluding the influence of defects.

Operation when Changing Inspection Range

Figure 9:
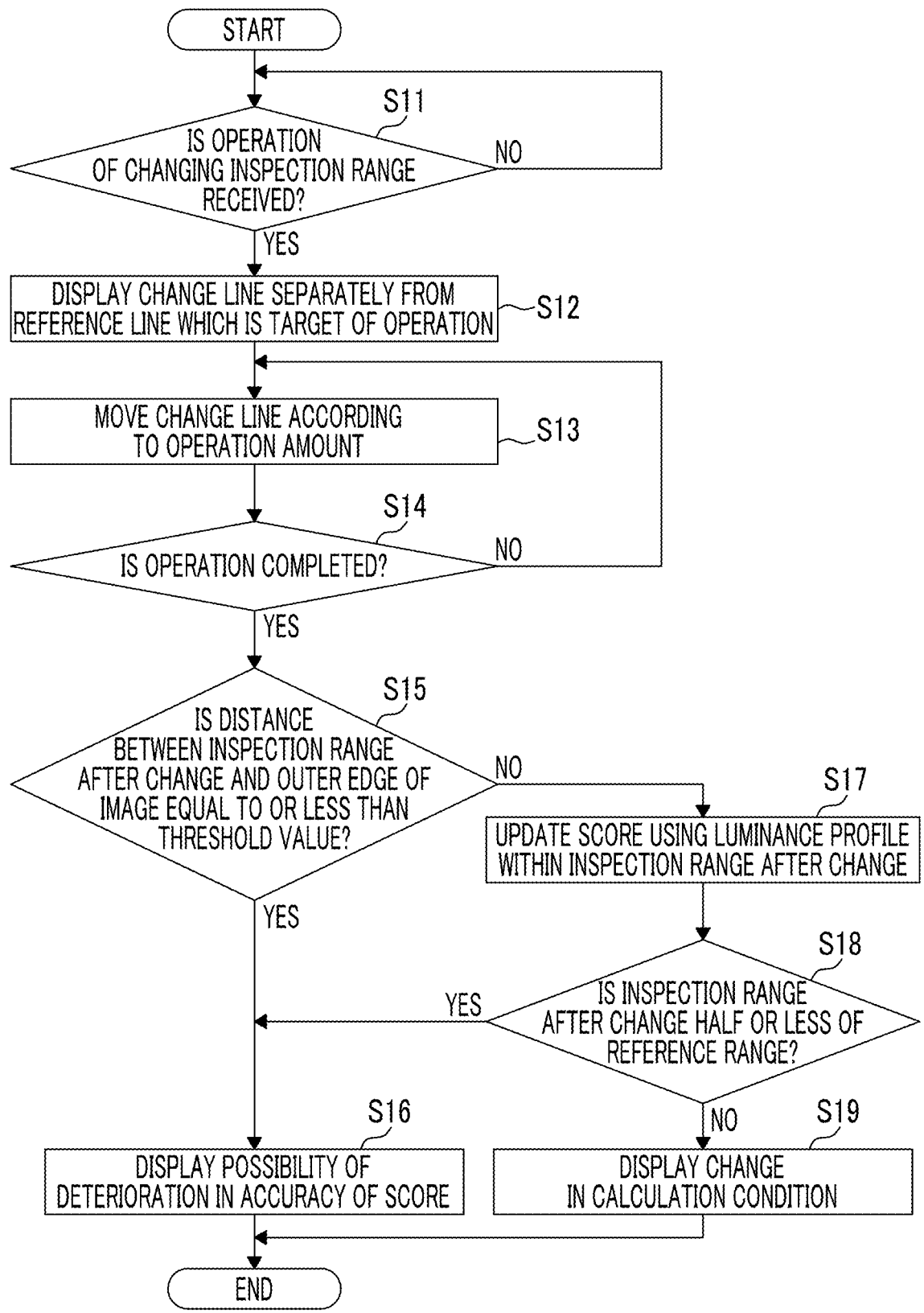
FIG. 9 is a flowchart illustrating an example of a processing operation executed due to a change in the inspection range.

FIG. 9 is a flowchart illustrating an example of a processing operation executed due to a change in the inspection range.

The process shown in FIG. 9 is also implemented through the execution of the program by the processor 101. The processing operation shown in FIG. 9 is executed independently of the processing operation described in FIG. 5.

First, the processor 101 determines whether or not the operation of changing the inspection range is received (step S11).

In the case of the present exemplary embodiment, the processor 101 considers that one of the four reference lines 121A is selected as the reception of the operation of changing the inspection range. The selection of the reference line 121A is executed, for example, by tapping, double tapping, or long tapping the specific reference line 121A by the operator. Note that, tapping refers to tapping the display surface once with a fingertip, double tapping refers to tapping the display surface twice with a fingertip, and long tapping refers to pressing the display surface with a fingertip for a long time. In other words, long tapping refers to that a fingertip stays in an identical place for a predetermined time period or longer.

While a negative result is obtained in step S11, the processor 101 repeats the determination in step S11.

On the other hand, in a case where a positive result is obtained in step S11, the processor 101 displays the change line separately from the reference line 121A (see FIG. 6) which is the target of the operation (step S12). The change line herein is displayed in a form that can be distinguished from the reference line 121A. For example, in a case where the reference line 121A is displayed in yellow, the change line is displayed in red. Of course, the color combination is just an example.

Next, the processor 101 moves the change line according to the operation amount (step S13). In the case of the present exemplary embodiment, the direction in which the change line can be moved is determined for each selected reference line 121A. Basically, it is possible to move in the direction orthogonal to the change line. For example, in a case where the reference line 121A is a vertical line, the change line can move only in the horizontal direction, and in a case where the reference line 121A is a horizontal line, the change line can move only in the vertical direction.

Subsequently, the processor 101 determines whether or not the operation is completed (step S14). For example, in a case where the fingertip is separated from the screen, the movement of the fingertip is stopped, or the stop of the fingertip continues for a predetermined time period or longer, the processor 101 determines that the operation is completed.

In a case where a negative result is obtained in step S14, the processor 101 returns to step S13.

On the other hand, in a case where a positive result is obtained in step S14, the processor 101 determines whether or not a distance between the inspection range after the change and the outer edge of the image is equal to or less than a threshold value (step S15).

In the present exemplary embodiment, in order to avoid a decrease in the accuracy of the calculated score, an operation that does not include an image near the outer edge of the captured image field 121 (see FIG. 6) is employed.

In a case where a positive result is obtained in step S15, the processor 101 displays a possibility of the deterioration in the accuracy of the score and ends the process (step S16). In the case of the present exemplary embodiment, since the operation of changing the inspection range has been completed, a display prompting the resetting of the inspection range is performed. In a case where the determination of step S15 is executed between step S13 and step S14, a positive result may be obtained and the process may return to step S13 after the display of step S16.

In a case where a negative result is obtained in step S15, the processor 101 updates the score using the luminance profile within the inspection range after the change (step S17).

After that, the processor 101 determines whether or not the inspection range after the change is half or less of the reference range (step S18). The reference range is an inspection range surrounded by four reference lines 121A. The inspection range after the change is a range surrounded by the change line displayed in the captured image field 121 and the reference line 121A that is not the target of the change.

In the case of the present exemplary embodiment, in a case where the area of the inspection range after the change becomes half or less of the area of the reference range, a positive result is obtained in step S18.

In a case where a positive result is obtained in step S18, the processor 101 displays a possibility of the deterioration in the accuracy of the score (step S16).

On the other hand, in a case where a negative result is obtained in step S18, the processor 101 displays a change in the calculation condition (step S19).

Example of Operation Screen

Hereinafter, an example of a screen displayed at the time of inspection of the inspection target 10 by the surface inspection apparatus 1 will be described.

Screen Example 1

Figure 10:
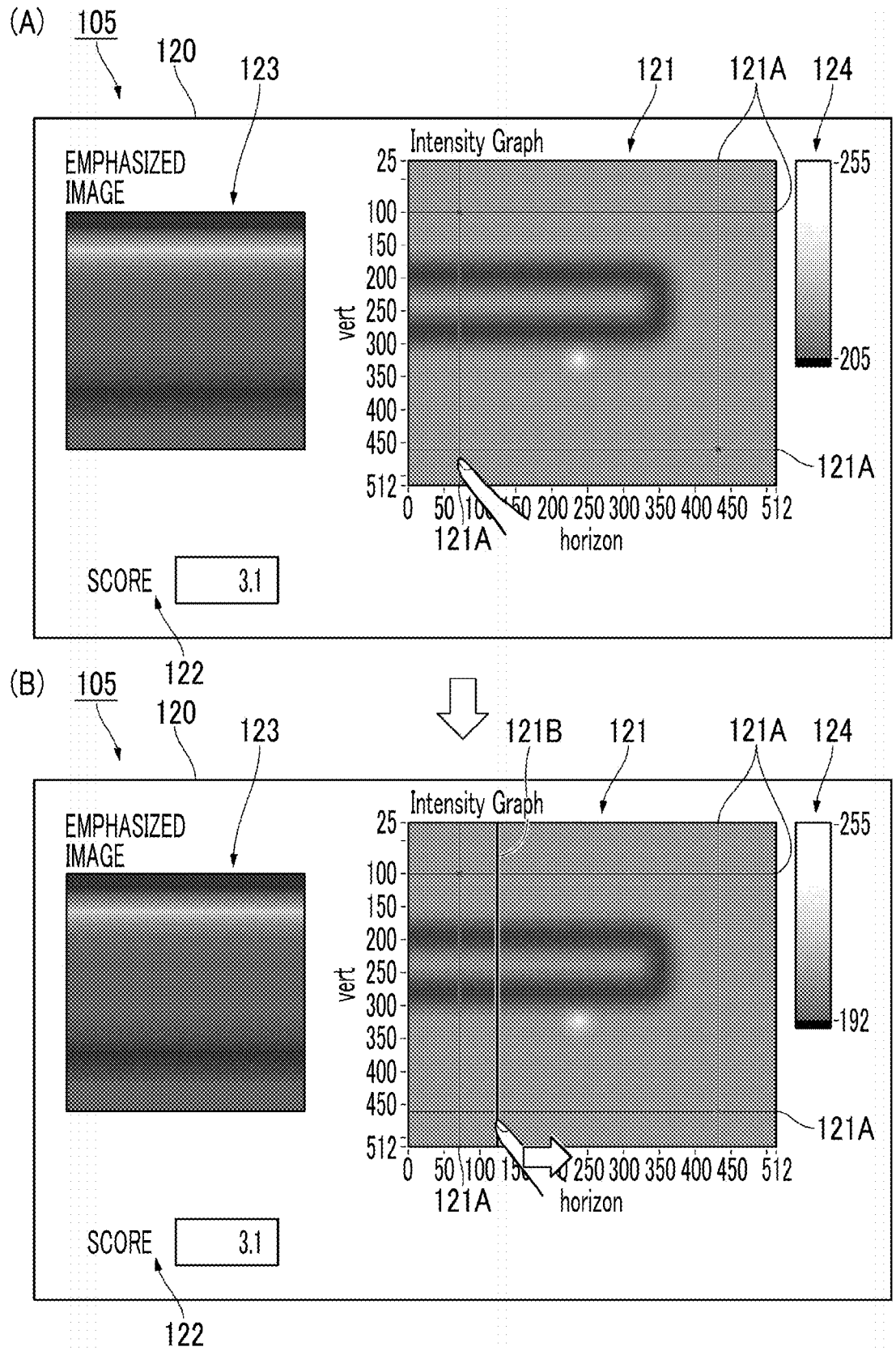
FIG. 10 is a diagram illustrating a change in the operation screen due to a change in the inspection range, in which a part (A) in FIG. 10 shows a screen example at the time when a reference line on the left side of four reference lines defining the inspection range is designated and a part (B) in FIG. 10 shows an example of a screen in which a change line is moving.

FIG. 10 is a diagram illustrating a change in the operation screen 120 due to a change in the inspection range. A part (A) in FIG. 10 shows a screen example at the time when the reference line 121A on the left side of four reference lines 121A defining the inspection range is designated, and a part (B) in FIG. 10 shows an example of a screen in which the change line 121B is moving. In FIG. 10, portions corresponding to the portions in FIG. 6 are denoted by the corresponding reference numerals. The change line 121B is an example of a second index indicating the inspection range after the change.

The captured image field 121 shown in the part (A) and the part (B) in FIG. 10 includes one pattern having a substantially circular shape corresponding to a sink mark. In the score field 122 of the operation screen 120, a numerical value of "3.1" is displayed as the score calculated for this partial region.

In the part (A) in FIG. 10, the reference line 121A on the left side is selected by the fingertip. This selection is received as an operation of changing the inspection range.

With the reception of the operation, the display color of the reference line 121A is switched to the display color of the change line 121B. By switching the display color, the operator knows that the inspection range can be changed. In addition, in the part (A) and the part (B) in FIG. 10, the difference in display color is expressed by the difference in line type.

After that, the change line 121B moves to the right as the fingertip moves. After the change line 121B is moved, the reference line 121A selected as the movement target is displayed at the first position. This allows the operator to visually observe the amount of movement of the change line 121B.

In the case of the present exemplary embodiment, the score calculation is executed at the time when the movement of the change line 121B is completed. Therefore, the score in the score field 122 in the part (B) in FIG. 10 remains "3.1".

Figure 11:
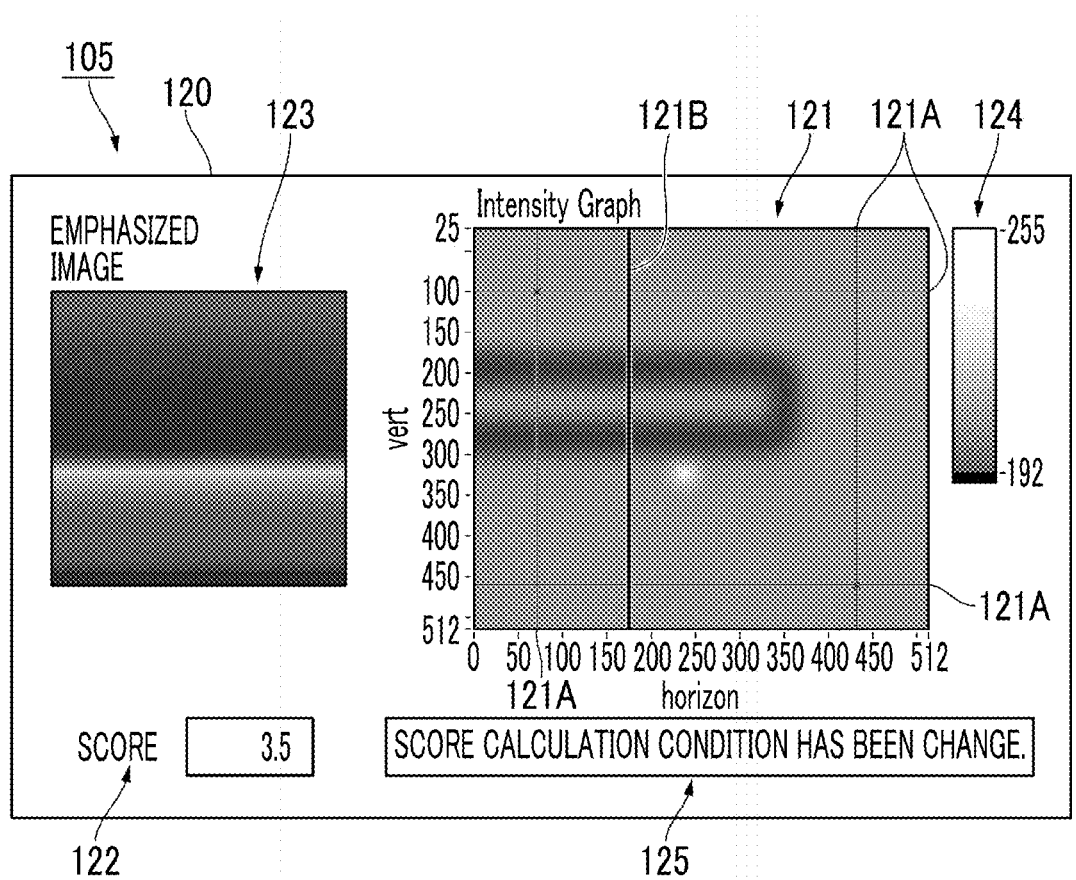
FIG. 11 is a diagram illustrating the operation screen at the time when the change of the position of the left side of the inspection range is completed.

FIG. 11 is a diagram illustrating the operation screen 120 at the time when the change of the position of the left side of the inspection range is completed. In FIG. 11, portions corresponding to the portions in FIG. 10 are denoted by the corresponding reference numerals.

In the case of FIG. 11, the change line 121B is located on the right side of the corresponding reference line 121A and on the left side of the left end of the pattern having a substantially circular shape.

In the case of FIG. 11, the score in the score field 122 is updated to "3.5". The score herein is calculated for a range surrounded by the change line 121B that gives a left side, the reference line 121A that gives an upper side, the reference line 121A that gives a right side, and the reference line 121A that gives a lower side.

In addition, a caution statement 125 such as "The score calculation condition has been changed" is additionally displayed at the lower part of the operation screen 120.

By displaying the caution statement 125, the operator can notice that the score calculation condition has been changed due to the change in the inspection range.

The emphasized image displayed in the emphasized image field 123 of the operation screen 120 is identical before and after the change in the inspection range.

Figure 12:
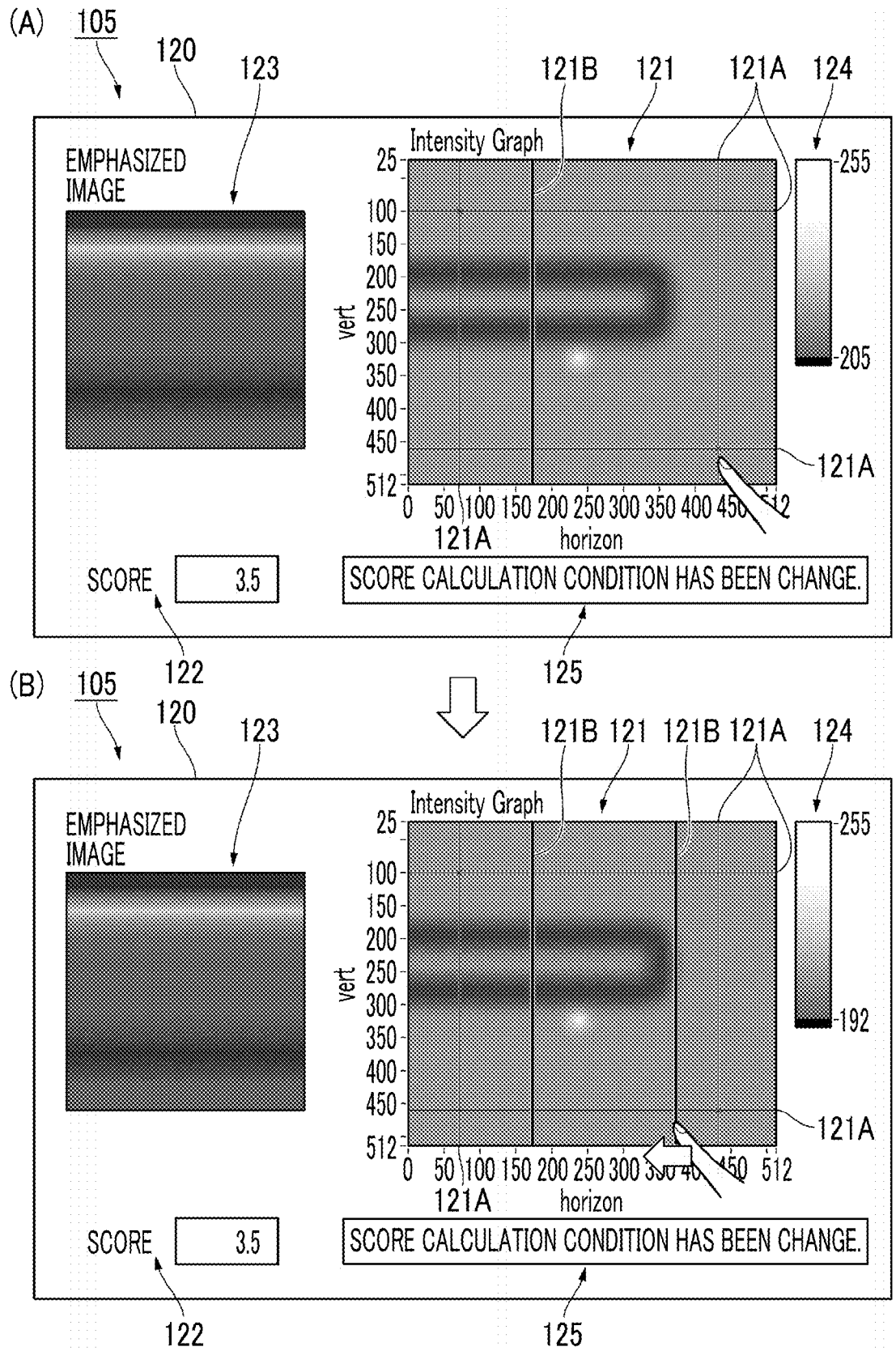
FIG. 12 is a diagram illustrating a change in the operation screen in a case where the inspection range is additionally changed, in which a part (A) in FIG. 12 shows a screen example at the time when the reference line on the right side of four reference lines defining the inspection range is designated and a part (B) in FIG. 12 shows an example of a screen in which the change line is moving.

FIG. 12 is a diagram illustrating a change in the operation screen 120 in a case where the inspection range is additionally changed. A part (A) in FIG. 12 shows a screen example at the time when the reference line 121A on the right side of four reference lines 121A defining the inspection range is designated, and a part (B) in FIG. 12 shows an example of a screen in which the change line 121B is moving. In FIG. 12, portions corresponding to the portions in FIG. 11 are denoted by the corresponding reference numerals.

That is, the operation screen 120 shown in FIG. 12 is identical to the operation screen 120 shown in FIG. 11. Therefore, the score in the score field 122 is "3.5". Further, since the inspection range has been changed from the initial state, the caution statement 125 remains displayed at the lower part of the operation screen 120.

In the part (A) in FIG. 12, the reference line 121A on the right side is selected by the fingertip. This selection is received as an operation of changing the inspection range.

With the reception of the operation, the display color of the reference line 121A is switched to the display color of the change line 121B. By switching the display color, the operator knows that the inspection range can be changed. Also in the part (A) and the part (B) in FIG. 12, the difference in display color is expressed by the difference in line type.

After that, the change line 121B moves to the left as the fingertip moves. After the change line 121B is moved, the reference line 121A selected as the movement target is displayed at the first position. This allows the operator to visually observe the amount of movement of the change line 121B.

In the case of the present exemplary embodiment, the score calculation is executed at the time when the movement of the change line 121B is completed. Therefore, the score in the score field 122 of the part (B) in FIG. 12 remains "3.5".

Figure 13:
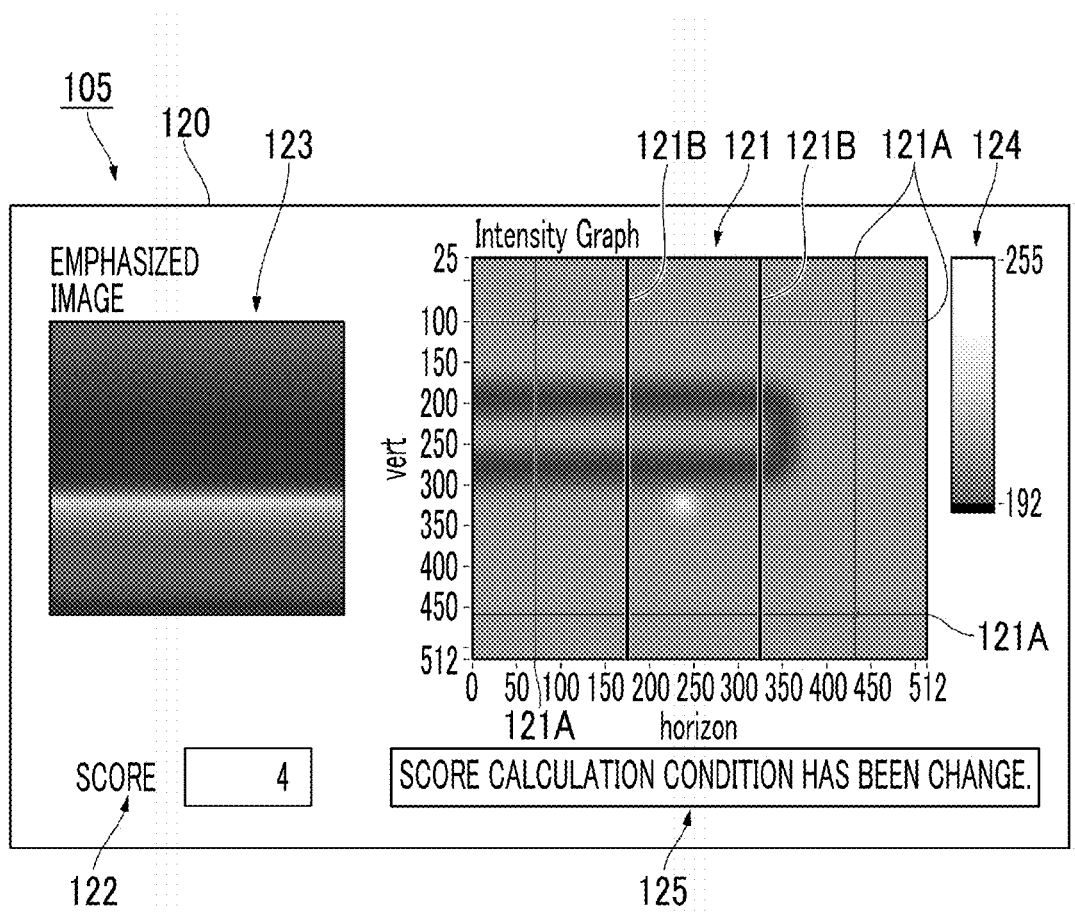
FIG. 13 is a diagram illustrating the operation screen at the time when the change of the position of the right side of the inspection range is completed.

FIG. 13 is a diagram illustrating the operation screen 120 at the time when the change of the position of the right side of the inspection range is completed. In FIG. 13, portions corresponding to the portions in FIG. 12 are denoted by the corresponding reference numerals.

In the case of FIG. 13, the change line 121B is located on the left side of the corresponding reference line 121A and on the right side of the right end of the pattern having a substantially circular shape.

In the case of FIG. 13, the score in the score field 122 is updated to "4".

The score herein is calculated for a range surrounded by the change line 121B that gives a left side, the reference line 121A that gives an upper side, the change line 121B that gives a right side, and the reference line 121A that gives a lower side. Due to the narrowing of the width of the inspection range in the X-axis direction, the numerical values of the score give a more accurate circular sink mark condition.

The emphasized image displayed in the emphasized image field 123 of the operation screen 120 is identical before and after the change in the inspection range.

Screen Example 2

Figure 14:
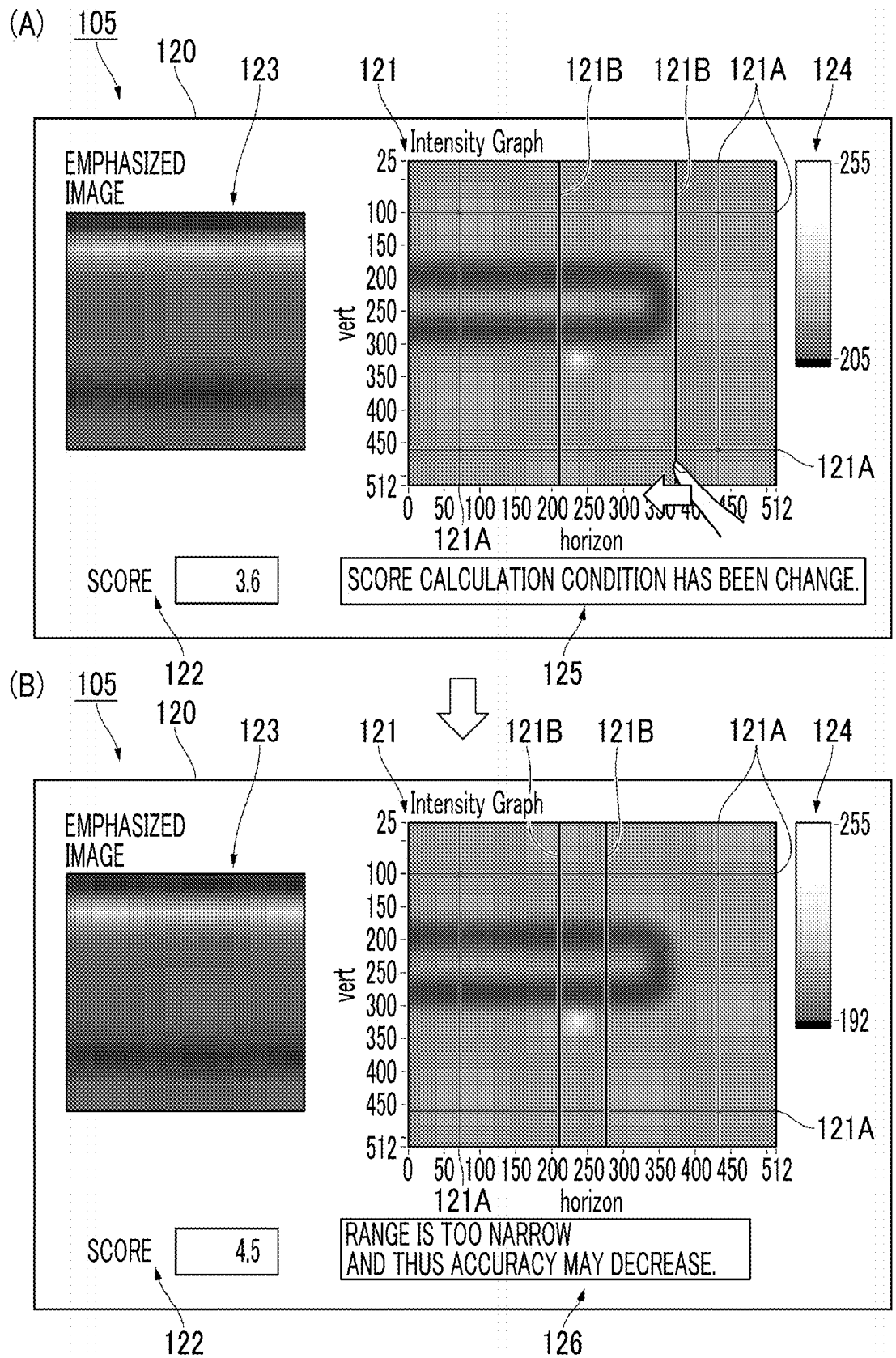
FIG. 14 is a diagram illustrating the operation screen in a case where the inspection range after the change is half or less of a reference range, in which a part (A) in FIG. 14 shows a screen example during movement of the change line that gives the right side of the reference range and a part (B) in FIG. 14 shows a screen example at the time when the change in the reference range is completed.

FIG. 14 is a diagram illustrating the operation screen 120 in a case where the inspection range after the change is half or less of a reference range. A part (A) in FIG. 14 shows a screen example during movement of the change line 121B that gives the right side of the reference range, and a part (B) in FIG. 14 shows a screen example at the time when the change in the reference range is completed. In FIG. 14, portions corresponding to the portions in FIG. 12 are denoted by the corresponding reference numerals.

In the case of the part (A) in FIG. 14, the change line 121B that gives the left side of the reference range is located at the left end of the sink mark.

On the other hand, in the case of the part (B) in FIG. 14, the change line 121B that gives the right side of the reference range is located at the right end of the sink mark.

Meanwhile, the distance between the left and right change lines 121B is less than half the distance between the left and right reference lines 121A. In other words, in the inspection range after the change, the decrease with respect to the reference range exceeds the threshold value. The threshold value herein is, for example, half of the reference range.

In this case, a caution statement 126 such as "The range is too narrow and thus the accuracy may decrease." is displayed at the lower part of the operation screen 120 shown in the part (B) in FIG. 14 to call the operator's attention. The display of this caution statement 126 is a kind of warning.

In the score field 122, "4.5" is displayed as the score calculated for the designated inspection range. Meanwhile, the reliability of this score is not guaranteed.

Screen Example 3

Figure 15:
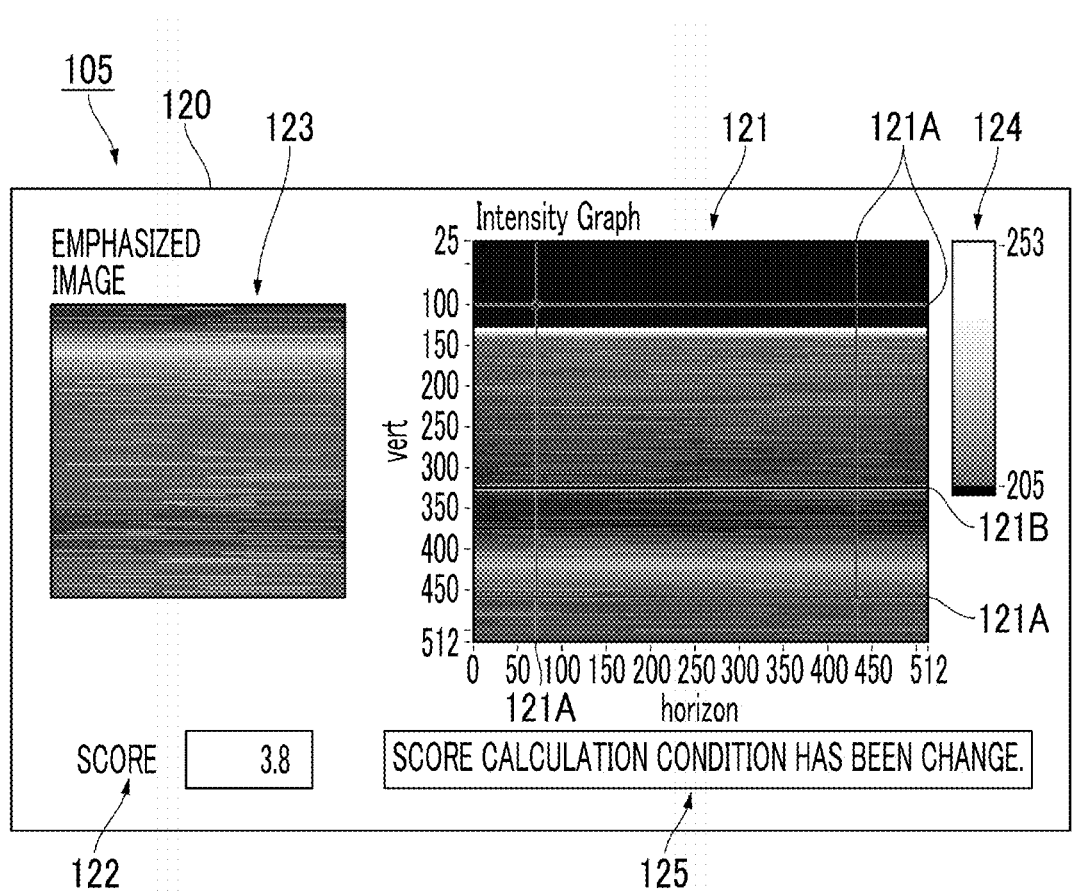
FIG. 15 is a diagram illustrating another example of the change in the reference range.

FIG. 15 is a diagram illustrating another example of the change in the reference range. In FIG. 15, portions corresponding to the portions in FIG. 11 are denoted by the corresponding reference numerals.

In the case of FIG. 15, the structural outer edge of the inspection target 10 (see FIG. 1) and the background thereof are shown near the upper end of the captured image field 121. This type of image is captured in a case where the inspection target 10 is small or the flat surface portion is small. The lower end side of the captured image field 121 shown in FIG. 15 includes a streaky pattern in which high luminance and low luminance are adjacent to each other.

In this case, the operator pays attention to the streaky pattern that affects the defects and texture on the surface of the inspection target 10. However, in the score field 122, the largest numerical value among the scores calculated for a plurality of locations within the inspection range is displayed.

Therefore, the score of the luminance profile corresponding to the difference in luminance between the structural outer edge and the background thereof may be larger than the score of the luminance profile corresponding to the sink mark on the surface of the inspection target 10.

In fact, in the emphasized image field 123, an emphasized image in which the feature of the upper part of the captured image field 121 is emphasized is displayed.

Meanwhile, what the operator wants to know is the score corresponding to the sink mark on the surface of the inspection target 10.

Therefore, in the operation screen 120 shown in FIG. 15, the upper side of the inspection range is changed from the reference line 121A to the change line 121B. In this example, the score in the score field 122 is "3.8".

Meanwhile, since the inspection range has been changed, the caution statement 125 such as "The score calculation condition has been changed" is additionally displayed at the lower part of the operation screen 120.

Figure 16:
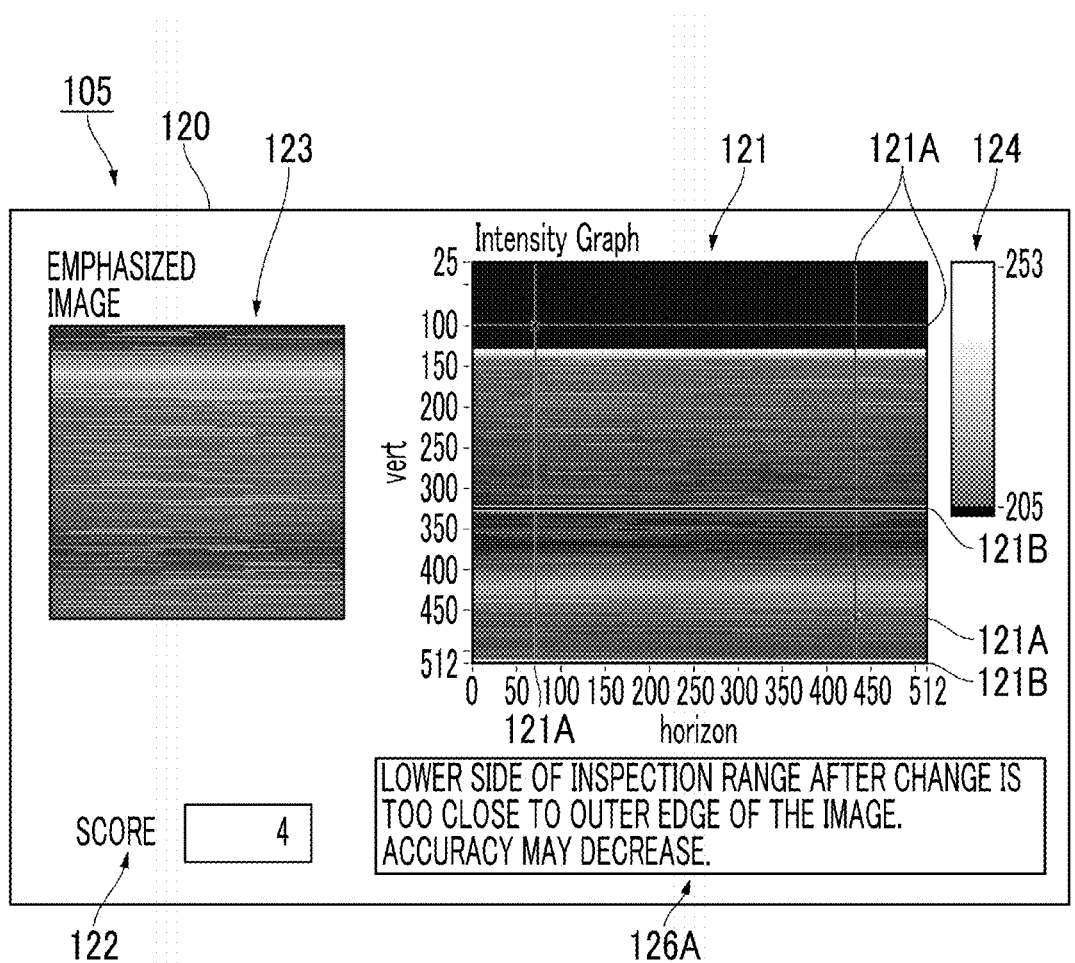
FIG. 16 is a diagram illustrating an example in which the change line that gives the lower side of the inspection range is set on the lower side of a captured image field.

FIG. 16 is a diagram illustrating an example in which the change line 121B that gives the lower side of the inspection range is set on the lower side of the captured image field 121. In FIG. 16, portions corresponding to the portions in FIG. 15 are denoted by the corresponding reference numerals.

In the case of FIG. 16, the change line 121B that gives the lower side of the inspection range is located below the reference line 121A. Specifically, the change line 121B is located at the lower end of the captured image field 121. In the case of the present exemplary embodiment, the distance between the outer edge of the inspection range and the outer edge of the captured image field 121 is required to be longer than the threshold value for any side.

However, in the case of FIG. 16, the change line 121B that gives the lower side of the inspection range coincides with the lower end of the captured image field 121, and does not satisfy the required rule.

In this case, a caution statement 126A such as "The lower side of the inspection range after the change is too close to the outer edge of the image. The accuracy may decrease." is displayed at the lower part of the operation screen 120 to call the operator's attention. The display of this caution statement 126A is also a kind of warning.

From the display of the caution statement 126A, the operator knows that the inspection range needs to be readjusted or the like. In the case of FIG. 16, "4" is displayed as a score in the score field 122.

Second Exemplary Embodiment

In the present exemplary embodiment, another operation screen 120 in the case of changing the inspection range will be described.

The appearance configuration and the like of the surface inspection apparatus 1 according to the present exemplary embodiment are identical to the appearance configuration and the like of the surface inspection apparatus 1 described in the first exemplary embodiment.

Figure 17:
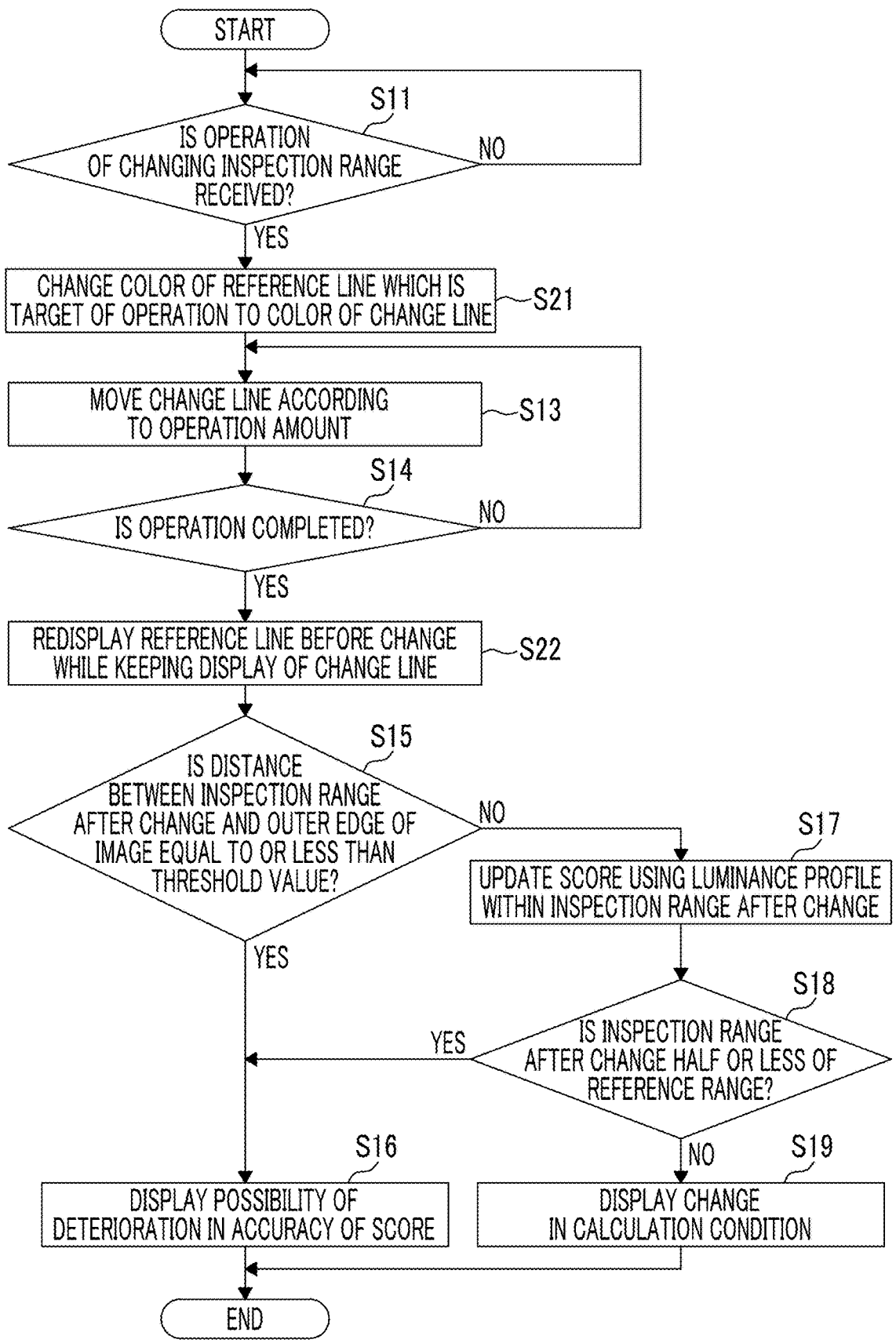
FIG. 17 is a flowchart illustrating another example of the processing operation executed due to a change in the inspection range.

FIG. 17 is a flowchart illustrating another example of the processing operation executed due to a change in the inspection range. In FIG. 17, portions corresponding to the portions in FIG. 9 are denoted by the corresponding reference numerals.

First, the processor 101 determines whether or not the operation of changing the inspection range is received (step S11).

While a negative result is obtained in step S11, the processor 101 repeats the determination in step S11.

On the other hand, in a case where a positive result is obtained in step S11, the processor 101 changes the color of the reference line 121A (see FIG. 6) which is the target of the operation to the color of the change line 121B (see part (B) in FIG. 10) (step S21).

Next, the processor 101 moves the change line 121B according to the operation amount (step S13). In the case of the present exemplary embodiment, the corresponding reference line 121A is not displayed while the change line 121B is moving.

Subsequently, the processor 101 determines whether or not the operation is completed (step S14).

In a case where a negative result is obtained in step S14, the processor 101 returns to step S13.

On the other hand, in a case where a positive result is obtained in step S14, the processor 101 redisplays the reference line 121A before the change while keeping the display of the change line 121B (step S22). By redisplaying the corresponding reference line 121A, it is easy to check the amount of movement of the change line 121B.

Next, the processor 101 determines whether or not a distance between the inspection range after the change and the outer edge of the image is equal to or less than a threshold value (step S15).

In a case where a positive result is obtained in step S15, the processor 101 displays a possibility of the deterioration in the accuracy of the score (step S16). In a case where the determination of step S15 is executed between step S13 and step S14, a positive result may be obtained and the process may return to step S13 after the display of step S16.

In a case where a negative result is obtained in step S15, the processor 101 updates the score using the luminance profile within the inspection range after the change (step S17).

After that, the processor 101 determines whether or not the inspection range after the change is half or less of the reference range (step S18).

In a case where a positive result is obtained in step S18, the processor 101 displays a possibility of the deterioration in the accuracy of the score and ends the process (step S16).

On the other hand, in a case where a negative result is obtained in step S18, the processor 101 displays a change in the calculation condition (step S19).

Example of Operation Screen

Hereinafter, an example of a screen displayed at the time of inspection of the inspection target 10 by the surface inspection apparatus 1 will be described.

Figure 18:
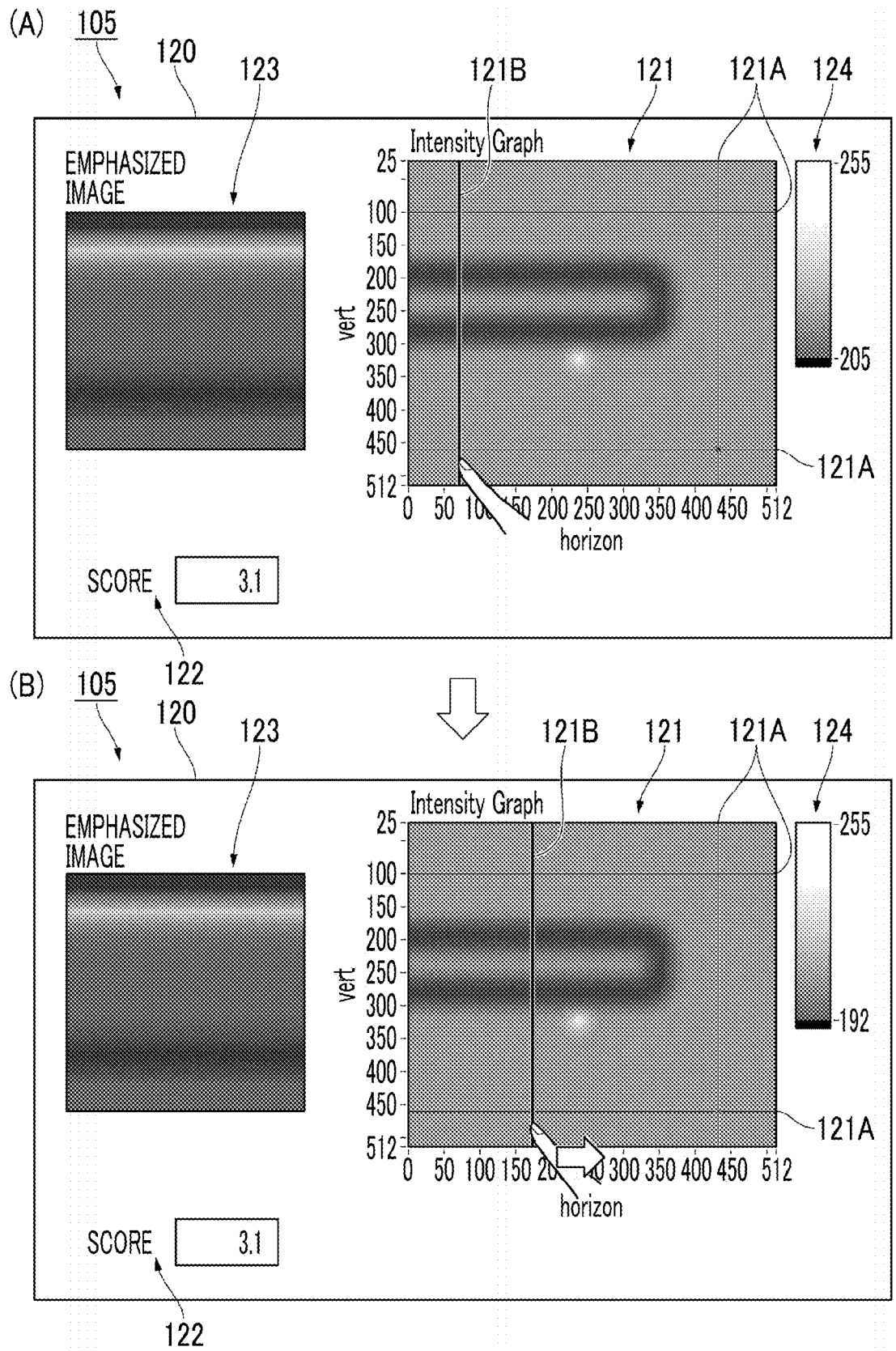
FIG. 18 is a diagram illustrating a change in the operation screen due to a change in the inspection range, in which a part (A) in FIG. 18 shows a screen example at the time when the reference line on the left side of four reference lines defining the inspection range is designated and a part (B) in FIG. 18 shows an example of a screen in which the change line is moving.

FIG. 18 is a diagram illustrating a change in the operation screen 120 due to a change in the inspection range. A part (A) in FIG. 18 shows a screen example at the time when the reference line 121A on the left side of four reference lines 121A defining the inspection range is designated, and a part (B) in FIG. 18 shows an example of a screen in which the change line 121B is moving. In FIG. 18, portions corresponding to the portions in FIG. 10 are denoted by the corresponding reference numerals.

In the case of the part (A) in FIG. 18, the reference line 121A defining the left side of the inspection range is selected by the fingertip. Therefore, the display color on the left side of the inspection range is changed to the display color of the change line 121B. By switching the display color, the operator knows that the inspection range can be changed. In the part (A) and the part (B) in FIG. 18, the difference in display color is expressed by the difference in line type.

After that, the change line 121B moves to the right as the fingertip moves. Even though the movement of the change line 121B is started, the corresponding reference line 121A is not displayed. This point is one of the differences from the first exemplary embodiment. In other words, in the present exemplary embodiment, the selected reference line 121A is changed to the change line 121B by the designation by the fingertip, and is moved by the fingertip as it is.

Figure 19:
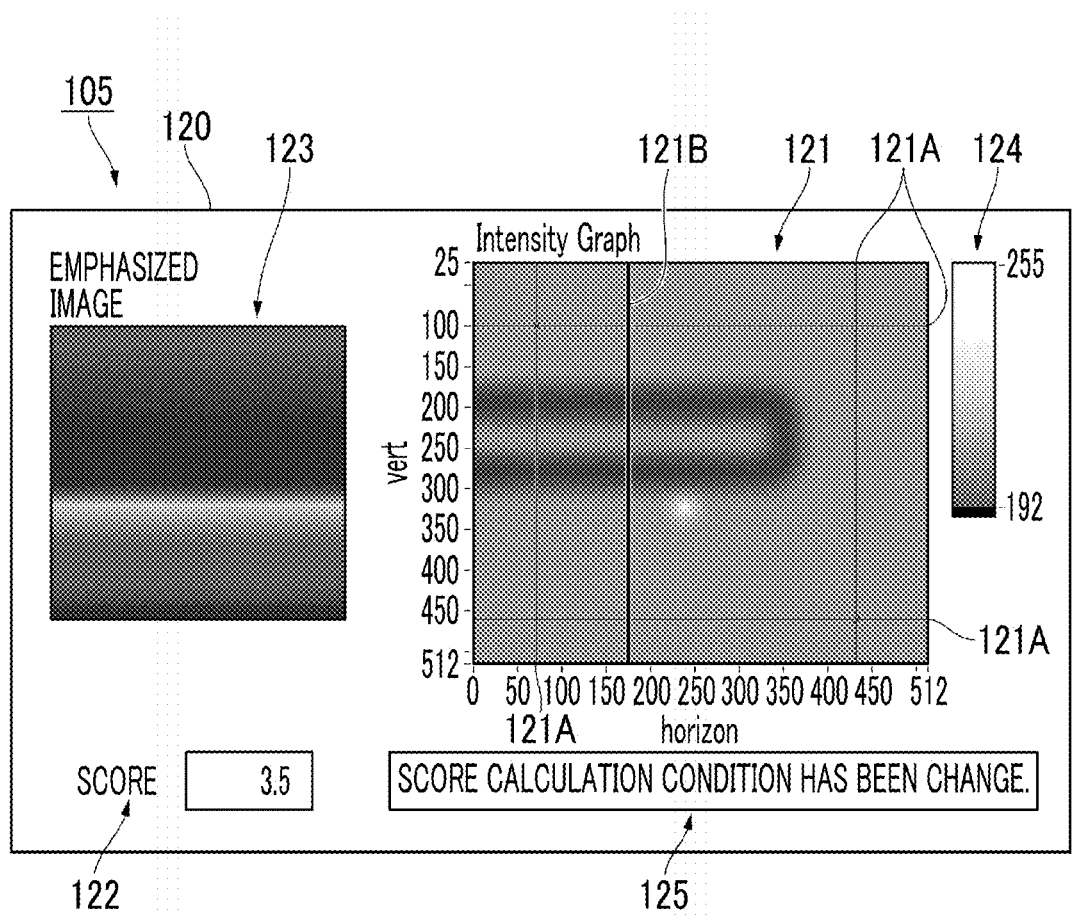
FIG. 19 is a diagram illustrating the operation screen at the time when the change of the position of the left side of the inspection range is completed.

FIG. 19 is a diagram illustrating the operation screen 120 at the time when the change of the position of the left side of the inspection range is completed. In FIG. 19, portions corresponding to the portions in FIG. 11 are denoted by the corresponding reference numerals.

In the case of FIG. 19, since the change of the inspection range is completed, the reference line 121A corresponding to the change line 121B is displayed again. Therefore, the operator can easily check the amount of movement of the change line 121B.

It is also possible not to display the reference line 121A before the change.

Third Exemplary Embodiment

In the case of the present exemplary embodiment, the surface inspection apparatus 1 (see FIG. 1) that does not require the operation of the imaging button in calculating the score will be described.

The appearance configuration and the like of the surface inspection apparatus 1 according to the present exemplary embodiment are identical to the appearance configuration and the like of the surface inspection apparatus 1 described in the first exemplary embodiment.

Figure 20:
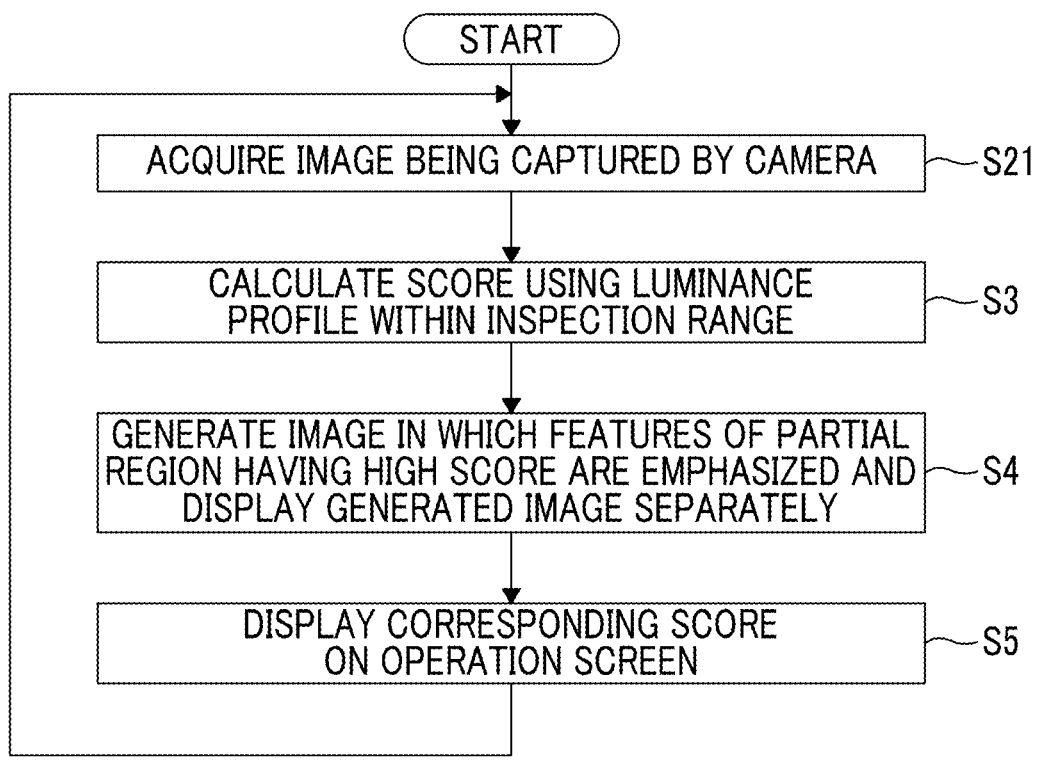
FIG. 20 is a flowchart illustrating an example of an inspection operation by a surface inspection apparatus used in a third exemplary embodiment.

FIG. 20 is a flowchart illustrating an example of an inspection operation by a surface inspection apparatus 1 used in a third exemplary embodiment. In FIG. 20, portions corresponding to the portions in FIG. 5 are denoted by the corresponding reference numerals.

In the case of FIG. 20, in the processor 101 (see FIGS. 4A and 4B), the light source 108 (see FIGS. 4A and 4B) is turned on by operating the power button, the imaging by the camera 107 (see FIGS. 4A and 4B) is started, and the score calculation and the like are performed at the same time.

Therefore, in a case where the processor 101 acquires the image being captured by the camera 107 (step S21), the processor 101 calculates the score using the luminance profile within the inspection range (step S3).

Hereinafter, the processor 101 generates an image emphasizing the feature of the partial region having a high score and displays the generated image separately (step S4), and displays the corresponding score on the operation screen 120 (step S5).

After the end of step S5, the processor 101 returns to step S21 and repeatedly executes a series of processes. By repeating this series of processes, the score displayed on the operation screen 120 (see FIG. 6) is continuously updated according to the change of the image captured by the camera 107.

That is, in a case where the position imaged by the camera 107 changes, the score displayed in the score field 122 also changes.

Fourth Exemplary Embodiment

Figure 21:
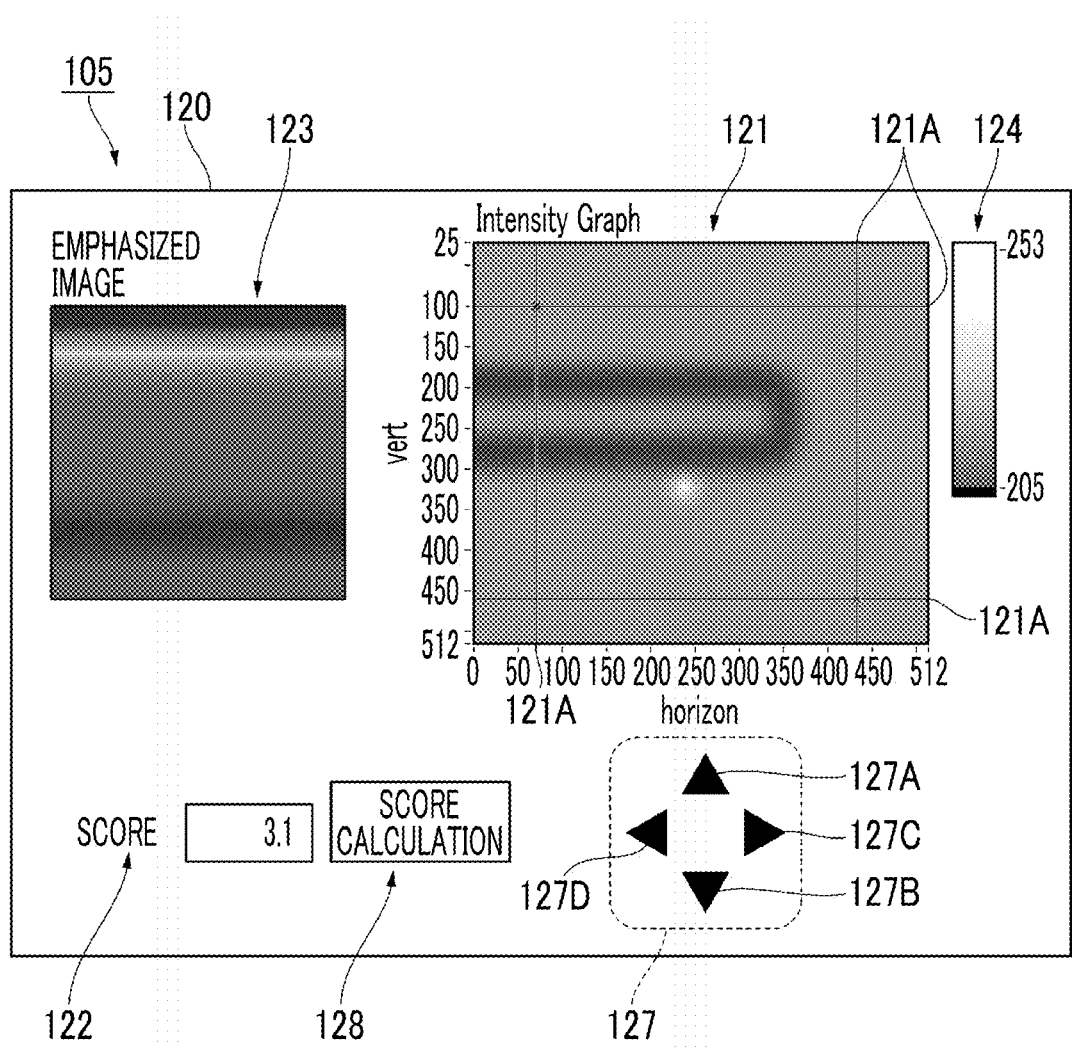
FIG. 21 is a diagram illustrating an example in which a dedicated button for receiving a change in the inspection range is arranged on the operation screen.

FIG. 21 is a diagram illustrating an example in which a dedicated button 127 for receiving a change in the inspection range is arranged on the operation screen 120. In FIG. 21, portions corresponding to the portions in FIG. 6 are denoted by the corresponding reference numerals.

The button 127 is configured with a move button 127A for giving an instruction of the upward movement of the selected reference line 121A, a move button 127B for giving an instruction of the downward movement of the selected reference line 121A, a move button 127C for giving an instruction of the rightward movement of the selected reference line 121A, and a move button 127D for giving an instruction of the leftward movement of the selected reference line 121A.

For example, in a case where the move button 127A is operated after selecting the reference line 121A that defines the upper side or the reference line 121A that defines the lower side of the inspection range, the change line 121B (see part (A) and part (B) in FIG. 10) moves upward.

For example, in a case where the move button 127C is operated after selecting the reference line 121A that defines the left side or the reference line 121A that defines the right side of the inspection range, the change line 121B moves to the right.

The button 127 herein is an operator different from the imaging button.

In the case of the present exemplary embodiment, while the move button 127A, 127B, 127C, or 127D is being operated, the change line 121B corresponding to the selected reference line 121A continues to move in the direction corresponding to each button.

In a case where the movement button 127A, 127B, 127C, or 127D is tapped, the change line 121B moves in the direction corresponding to each button by a predetermined amount of movement.

Further, on the operation screen 120 shown in FIG. 21, a button 128 for giving an instruction to start score calculation is arranged.

Therefore, unlike the first exemplary embodiment, the score is not calculated by operating the imaging button. Further, unlike the second exemplary embodiment, the score is not calculated by operating the power button.

In the case of the present exemplary embodiment, in a case where the button 128 is operated, the calculation of the score for the inspection range is started, and the score is displayed in the score field 122. The button 128 is an example of a second operator. The calculation of the score after changing the inspection range is also executed by operating the button 128.

Fifth Exemplary Embodiment

In the present exemplary embodiment, an example in which a physical operator for changing the inspection range is arranged in the housing 100 (see FIGS. 4A and 4B) will be described.

Figure 22:
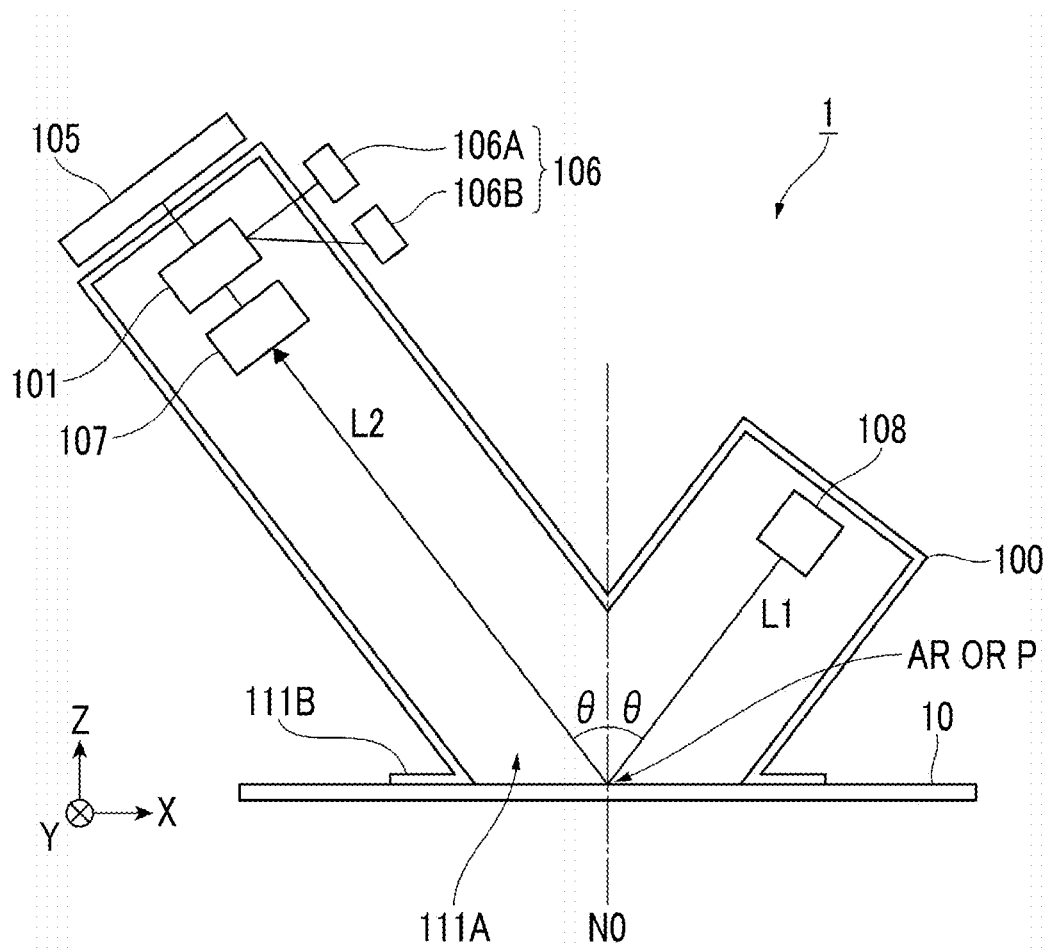
FIG. 22 is a diagram illustrating a structural example of an optical system of a surface inspection apparatus according to a fifth exemplary embodiment.

FIG. 22 is a diagram illustrating a structural example of an optical system of a surface inspection apparatus 1 according to a fifth exemplary embodiment. In FIG. 22, portions corresponding to the portions in FIGS. 4A and 4B are denoted by the corresponding reference numerals.

In the case of FIG. 22, an imaging button 106A and an operation button 106B for giving an instruction of a change in the inspection range are arranged on the side surface of the housing 100.

The operation button 106B herein is an example of a dedicated button for receiving a change in the inspection range.

For the operation button 106B, for example, a dial type button is used. In the case of a dial-type button, the direction of movement is determined by the direction of rotation, and the amount of movement is determined by the amount of rotation. For the dial-type button, for example, a jog dial or an angle knob is used. The jog dial has a mounting method in which the rotation axis of the cylinder is parallel to the housing surface and a mounting method in which the rotation axis of the cylinder is perpendicular to the housing surface.

For example, in a case where the operation button 106B is rotated clockwise while the reference line 121A that defines the upper or lower side of the inspection range is selected, the change line 121B moves upward, and in a case where the operation button 106B is rotated counterclockwise, the change line 121B moves downward.

On the other hand, in a case where the operation button 106B is rotated clockwise while the reference line 121A that defines the left or right side of the inspection range is selected, the change line 121B moves to the right, and in a case where the operation button 106B is rotated counterclockwise, the change line 121B moves to the left. The amount of movement is determined by the amount of rotation of the dial-type button.

Further, the operation button 106B may be configured with physical buttons corresponding to the four movement buttons 127A, 127B, 127C, and 127D constituting the button 127 shown in FIG. 21.

Further, the operation button 106B may be configured with a seesaw-type switch used for giving an instruction of the movement in the vertical direction and a seesaw-type switch used for giving an instruction of the movement in the left-right direction.

Sixth Exemplary Embodiment

Figure 23:
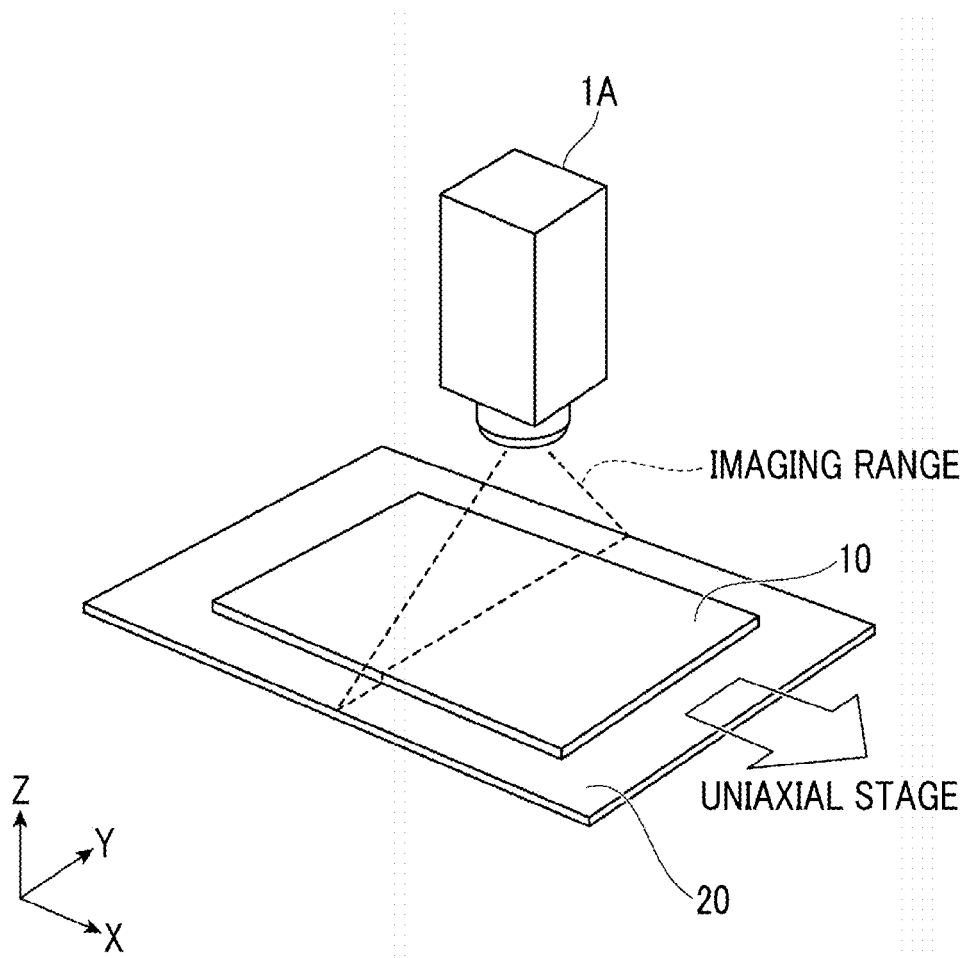
FIG. 23 is a diagram illustrating a usage example of a surface inspection apparatus assumed in a sixth exemplary embodiment.

FIG. 23 is a diagram illustrating a usage example of a surface inspection apparatus 1A assumed in a sixth exemplary embodiment. In FIG. 23, portions corresponding to the portions in FIG. 1 are denoted by the corresponding reference numerals.

A so-called line camera is used for an imaging unit of the surface inspection apparatus 1A used in the present exemplary embodiment. Therefore, the imaging range is linear.

In the case of the present exemplary embodiment, at the time of inspection, an inspection target 10 is moved in the direction of the arrow while being installed on a uniaxial stage 20. By moving the uniaxial stage 20 in one direction, the entire inspection target 10 is imaged.

The positional relationship between a camera 107 (see FIGS. 4A and 4B) and a light source 108 (see FIGS. 4A and 4B) is identical to the positional relationship between the camera 107 and the light source 108 of the first exemplary embodiment, except that the line camera is used as the camera 107 (see FIGS. 4A and 4B).

Other Exemplary Embodiments (1) Although the exemplary embodiments of the present invention have been described above, the technical scope of the present invention is not limited to the scope described in the above-described exemplary embodiments. It is clear from the description of the claims that the above-described exemplary embodiments with various modifications or improvements are also included in the technical scope of the present invention.

(2) In the above-described exemplary embodiments, a color camera is used as the camera 107 (see FIGS. 4A and 4B), but a monochrome camera may also be used. Further, the surface of the inspection target 10 (see FIG. 1) may be inspected using only the green (G) component of the color camera.

(3) In the above-described exemplary embodiments, a white light source is used as the light source 108 (see FIGS. 4A and 4B), but the illumination light may be any color.

Further, the illumination light is not limited to visible light, but may be infrared light, ultraviolet light, or the like.

(4) In the above-described exemplary embodiments, the surface inspection apparatus 1 (see FIG. 1) using one light source 108 (see FIGS. 4A and 4B) has been described, but the surface of the inspection target 10 is illuminated by using a plurality of light sources.

For example, two light sources may be used. In that case, one light source may be arranged at an angle at which a specular-reflected light component is mainly incident on the camera 107 (see FIGS. 4A and 4B), and the other light source may be arranged at an angle at which a diffusely reflected light component is mainly incident on the camera 107. In this case, the two light sources may be arranged on both sides of the optical axis of the camera 107, or may be arranged on one side with respect to the optical axis of the camera 107.

(5) In the above-described exemplary embodiments, a parallel light source is used as the light source 108 (see FIGS. 4A and 4B), but a point light source or a surface light source which is a non-parallel light source may be used. Further, a non-telecentric lens may be used on the optical axis of the camera 107 (see FIGS. 4A and 4B). In a case where a telecentric lens or parallel light is not used, the apparatus can be downsized and the cost can be reduced as compared with the surface inspection apparatus 1 (see FIG. 1) described in the exemplary embodiments.

(6) In the above-described exemplary embodiments, the processor 101 (see FIG. 3) of the surface inspection apparatus 1 (see FIG. 1) that images the inspection target 10 (see FIG. 1) realizes a function of calculating a score and receiving a change in the inspection range. However, an equivalent function may be realized by a processor of an external computer or server that acquires image data from the surface inspection apparatus 1.

(7) In the above-described exemplary embodiments, the position of one side that defines the outer edge of the inspection range is changed, but the positions of the two sides that define the outer edge of the inspection range may be changed at once by dragging the point where the two reference lines 121A intersect in the diagonal direction. Further, the inspection range may be changed by designating the changed positions of two corners out of the four corners that define the outer edge of the inspection range by tapping or the like.

(8) In the above-described exemplary embodiments, the inspection range is defined by a rectangular shape, but at least a part of the outer edge of the inspection range after the change may include a curved line. In this case, the inspection range after the change may be drawn by the operator freehand on the captured image field 121. For example, the inspection range after the change may be defined by a circle, an ellipse, an arc, or a closed free curve.

(9) In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A surface inspection apparatus comprising:
   an imaging device configured to image a surface of an object to be inspected; and
   a processor configured to:
      calculate a numerical value representing a quality of the surface by processing an image captured by the imaging device; and
      receive a change in a range used to calculate the numerical value indicated by an index in the image,
      display, in the image, a first index indicating the range before receiving the change and a second index indicating the range after receiving the change,
      wherein the first index is displayed even during the change of the range.

2. The surface inspection apparatus according to claim 1, wherein the second index is displayed after receiving an operation of changing a position of the first index.

3. The surface inspection apparatus according to claim 2, wherein the second index is able to be drawn by a curved line.

4. The surface inspection apparatus according to claim 1, wherein the processor is configured to:
   receive a change in which an area of the range after the change is smaller than an area of the range before the change.

5. The surface inspection apparatus according to claim 4, wherein the processor is configured to:
   receive a change in which the entire range after the change is included in the range before the change.

6. The surface inspection apparatus according to claim 1, wherein the processor is configured to:
   in a case where the change in the range is received, calculate the numerical value for the range after the change.

7. The surface inspection apparatus according to claim 6, wherein the processor is configured to:
   in a case where the change in the range is received after the calculation of the numerical value, recalculate the numerical value for the range after the change.

8. The surface inspection apparatus according to claim 1, wherein the processor is configured to:
   in a case where the change in the range is received, display on a screen that the numerical value is calculated under a condition different from a reference range.

9. The surface inspection apparatus according to claim 1, wherein the processor is configured to:
   in a case where a reduction in the range after the change exceeds a threshold value, provide a warning of a decrease in accuracy of the calculated numerical value.

10. The surface inspection apparatus according to claim 1, wherein the processor is configured to:
    in a case where a distance between an outer edge of the range after the change and an outer edge of the image is shorter than a predetermined threshold value, provide a warning of a decrease in accuracy of the calculated numerical value.

11. The surface inspection apparatus according to claim 1, further comprising a dedicated operator for receiving a change in a shape of the range.

12. The surface inspection apparatus according to claim 11, wherein the operator is provided separately from a second operator used to give an instruction to start a calculation of the numerical value.

13. The surface inspection apparatus according to claim 11, wherein the operator is provided separately from a third operator used to capture the image.

14. The surface inspection apparatus according to claim 1, wherein a main body of the surface inspection apparatus is portable.

15. A non-transitory computer readable medium storing a program causing a computer for calculating a numerical value representing a quality of a surface of an object to be inspected by processing an image captured by an imaging device to realize a function comprising:
    receiving a change in a range used to calculate the numerical value indicated by an index in the image,
    displaying, in the image, a first index indicating the range before receiving the change and a second index indicating the range after receiving the change,
    wherein the first index is displayed even during the change of the range.

16. A surface inspection method comprising:
    receiving a change in a range used to calculate a numerical value indicated by an index in an image,
    displaying, in the image, a first index indicating the range before receiving the change and a second index indicating the range after receiving the change,
    wherein the first index is displayed even during the change of the range.

* * * * *